United States Patent
Masuda

(10) Patent No.: US 12,063,452 B2
(45) Date of Patent: Aug. 13, 2024

(54) CONTROL DEVICE, IMAGING SYSTEM, AND 3D MODEL DATA GENERATION METHOD

(71) Applicant: SONY GROUP CORPORATION, Tokyo (JP)

(72) Inventor: Tooru Masuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 96 days.

(21) Appl. No.: 17/787,129

(22) PCT Filed: Jan. 15, 2021

(86) PCT No.: PCT/JP2021/001159
§ 371 (c)(1),
(2) Date: Jun. 17, 2022

(87) PCT Pub. No.: WO2021/153261
PCT Pub. Date: Aug. 5, 2021

(65) Prior Publication Data
US 2023/0035765 A1    Feb. 2, 2023

(30) Foreign Application Priority Data

Jan. 30, 2020 (JP) .................................. 2020-013883

(51) Int. Cl.
*H04N 5/272* (2006.01)
*G06T 7/194* (2017.01)
(Continued)

(52) U.S. Cl.
CPC ............. *H04N 5/272* (2013.01); *G06T 7/194* (2017.01); *G06T 17/00* (2013.01); *H04N 5/77* (2013.01);
(Continued)

(58) Field of Classification Search
CPC ............ H04N 5/272; H04N 5/57; H04N 5/77; H04N 23/66; H04N 7/181; G06T 7/194;
(Continued)

(56) References Cited

U.S. PATENT DOCUMENTS 8,670,046 B2 *   3/2014   Ohba ................... H04N 9/8205
                                                                    348/240.99
8,810,708 B2 *   8/2014   Tsurumi ............... H04N 23/698
                                                                    348/333.03
(Continued)

FOREIGN PATENT DOCUMENTS

CN      102215342 A    10/2011
CN      108852386 A    11/2018
(Continued)

*Primary Examiner* — Wesner Sajous
(74) *Attorney, Agent, or Firm* — Paratus Law Group, PLLC

(57) ABSTRACT

There is provided a control device, an imaging system, and a 3D model data generation method capable of appropriately extracting a subject from a moving image. The control device includes a control unit that performs control to synchronize an imaging timing at which an imaging device performs imaging with a display timing at which a display device located in an imaging range of the imaging device displays a first moving image, and an image processing unit that performs foreground/background difference processing on the basis of a second moving image captured by the imaging device at a first timing and a third moving image captured by the imaging device at a second timing different from the first timing. The second moving image and the third moving image both include at least a part of the first moving image whose display timing is synchronized between the second moving image and the third moving image. The present technology can be applied to, for example, an imaging system for capturing a moving image used for generating a 3D model.

16 Claims, 17 Drawing Sheets

(51) Int. Cl.
  *G06T 17/00*   (2006.01)
  *H04N 5/77*   (2006.01)
  *H04N 7/18*   (2006.01)
  *H04N 23/66*   (2023.01)
(52) U.S. Cl.
  CPC ............ *H04N 7/181* (2013.01); *H04N 23/66* (2023.01); *G06T 2200/08* (2013.01); *G06T 2207/30196* (2013.01)
(58) Field of Classification Search
  CPC ................ G06T 17/00; G06T 2200/08; G06T 2207/30196
  See application file for complete search history.

(56) References Cited

U.S. PATENT DOCUMENTS

| | | | |
|---|---|---|---|
| 10,406,433 B2* | 9/2019 | Zalewski | A63F 13/213 |
| 10,834,315 B2* | 11/2020 | Kaneko | H04N 21/816 |
| 2014/0285699 A1 | 9/2014 | Kato | |
| 2015/0063775 A1 | 3/2015 | Nakamura | |
| 2020/0311947 A1* | 10/2020 | Handa | G06T 7/11 |

FOREIGN PATENT DOCUMENTS

| | | |
|---|---|---|
| CN | 109076170 A | 12/2018 |
| JP | 2009-074836 A | 4/2009 |
| JP | 2009-159525 A | 7/2009 |
| WO | WO 2018/150933 A1 | 8/2018 |

\* cited by examiner

CONTROL DEVICE, IMAGING SYSTEM, AND 3D MODEL DATA GENERATION METHOD

CROSS REFERENCE TO PRIOR APPLICATION

This application is a National Stage Patent Application of PCT International Patent Application No. PCT/JP2021/001159 (filed on Jan. 15, 2021) under 35 U.S.C. § 371, which claims priority to Japanese Patent Application No. 2020-013883 (filed on Jan. 30, 2020), which are all hereby incorporated by reference in their entirety.

TECHNICAL FIELD

The present technology relates to a control device, an imaging system, and a 3D model data generation method, and more particularly to a control device, an imaging system, and a 3D model data generation method capable of appropriately extracting a subject from a moving image.

BACKGROUND ART

There is a technology of generating a 3D model of a subject from moving images captured from multiple viewpoints and generating a virtual viewpoint image of the 3D model according to an arbitrary viewpoint position to provide an image of a free viewpoint. Such a technology is also referred to as a volumetric capture technology or the like.

For example, Patent Document 1 describes a technology of generating a 3D model using a method such as visual hull in which a three-dimensional shape of a subject is cut out on the basis of a plurality of captured images obtained by imaging from different directions.

CITATION LIST

Patent Document

Patent Document 1: International Patent Application Publication No. 2018/150933

SUMMARY OF THE INVENTION

Problems to be Solved by the Invention

In the generation of a 3D model, it is necessary to separate the subject and the background appearing in each of the captured images captured from multiple viewpoints. For example, by taking the difference between a background image obtained by imaging only the background in advance and a captured image obtained by imaging in a state where a subject such as a person is actually present, the subject and the background appearing in each captured image are separated.

Incidentally, in imaging for generating a 3D model, a situation is conceivable in which a person as a subject displays a moving image on a display device to confirm the content of acting or displays lines and lyrics on a prompter for reference.

However, in a case where, at the time of actual imaging in a state where a person is present, there is an object that was not present at the time of background imaging in the imaging space, the object itself is also treated as a subject. For example, in a case where a moving image is displayed on a display device arranged in an imaging space, the display of the moving image is also separated as a subject together with the person, and is used for generating a 3D model. Accordingly, at the time of actual imaging, it is difficult for a person as a subject to check the content of acting with reference to the display of a display device, or to check lines or lyrics with reference to the display of a prompter.

The present technology has been made in view of such a situation, and aims to appropriately extract a subject from a moving image.

Solutions to Problems

A control device according to one aspect of the present technology is a control device including a control unit that performs control to synchronize an imaging timing at which an imaging device performs imaging with a display timing at which a display device located in an imaging range of the imaging device displays a first moving image, and an image processing unit that performs foreground/background difference processing on the basis of a second moving image captured by the imaging device at a first timing and a third moving image captured by the imaging device at a second timing different from the first timing, in which the second moving image and the third moving image both include at least a part of the first moving image whose display timing is synchronized between the second moving image and the third moving image.

An imaging system according to one aspect of the present technology is an imaging system including: a plurality of imaging devices; at least one display device; a control unit that performs control to synchronize an imaging timing at which the plurality of imaging devices performs imaging with a display timing at which the display device located in an imaging range of at least one of the plurality of imaging devices displays a first moving image; and an image processing unit that performs foreground/background difference processing on the basis of a second moving image captured by the imaging device at a first timing and a third moving image captured by the imaging device at a second timing different from the first timing, in which the second moving image and the third moving image both include at least a part of the first moving image.

A 3D model data generation method according to one aspect of the present technology is a 3D model data generation method including: synchronizing an imaging timing at which the plurality of imaging devices performs imaging with a display timing at which a display device located in an imaging range of at least one of the plurality of imaging devices displays a first moving image, and imaging by a plurality of imaging devices; generating difference data by performing foreground/background difference processing on the basis of a second moving image captured by the imaging device at a first timing and a third moving image captured by the imaging device at a second timing different from the first timing; and generating 3D model data on the basis of the difference data.

In the control device according to one aspect of the present technology, control is performed to synchronize an imaging timing at which an imaging device performs imaging with a display timing at which a display device located in an imaging range of the imaging device displays a first moving image, and foreground/background difference processing is performed on the basis of a second moving image captured by the imaging device at a first timing and a third moving image captured by the imaging device at a second timing different from the first timing. The second moving image and the third moving image both include at least a part of the first moving image whose display timing is synchronized between the second moving image and the third moving image.

In the imaging system according to one aspect of the present technology, control is performed to synchronize an imaging timing at which the plurality of imaging devices performs imaging with a display timing at which a display device located in an imaging range of at least one of the plurality of imaging devices displays a first moving image, and foreground/background difference processing is performed on the basis of a second moving image captured by the imaging device at a first timing and a third moving image captured by the imaging device at a second timing different from the first timing. The second moving image and the third moving image both include at least a part of the first moving image.

In the 3D model data generation method according to one aspect of the present technology, imaging is performed by a plurality of imaging devices while synchronizing an imaging timing at which the plurality of imaging devices performs imaging with a display timing at which a display device located in an imaging range of at least one of the plurality of imaging devices displays a first moving image, difference data is generated by performing foreground/background difference processing on the basis of a second moving image captured by the imaging device at a first timing and a third moving image captured by the imaging device at a second timing different from the first timing and 3D model data is generated on the basis of the difference data.

MODE FOR CARRYING OUT THE INVENTION

Hereinafter, a mode for carrying out the present technology will be described. The description will be given in the following order.

1. Overview of imaging system
2. Configuration of imaging system
3. Operation of imaging system
4. Processing when performing monitoring display
5. Modification
6. Configuration example of computer <1. Overview of Imaging System>

Figure 1:
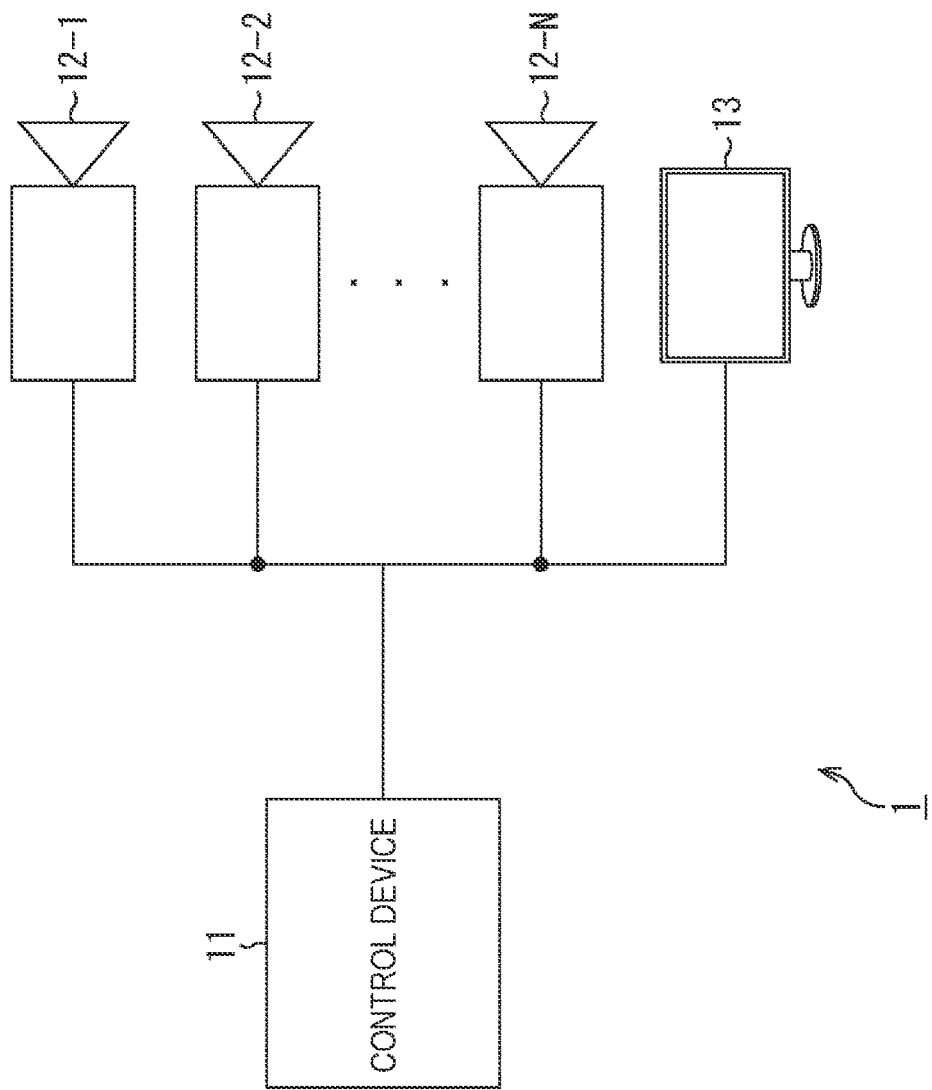
FIG. 1 is a diagram illustrating a configuration example of an imaging system to which the present technology is applied.

FIG. 1 is a diagram illustrating a configuration example of an imaging system 1 to which the present technology is applied.

The imaging system 1 in FIG. 1 includes a control device 11, N (N>1) cameras 12-1 to 12-N, and a monitor 13. The cameras 12-1 to 12-N and the monitor 13 are arranged in the same space such as an imaging studio.

The control device 11 includes, for example, a computer, a server device, or the like, and controls an imaging timing at which the cameras 12-1 to 12-N perform imaging and a display timing at which the monitor 13 displays a moving image.

Specifically, the control device 11 generates a synchronization signal and supplies the synchronization signal to each of the cameras 12-1 to 12-N and the monitor 13. An imaging timing at which the cameras 12-1 to 12-N perform imaging and a display timing at which the monitor 13 displays a moving image are controlled on the basis of the synchronization signal supplied from the control device 11. Additionally, the control device 11 also reproduces a moving image displayed on the monitor 13.

Moreover, the control device 11 generates, for example, a 3D model of an object in which a person appearing as a subject is an object from a plurality of captured moving images supplied from each of the cameras 12-1 to 12-N.

Data of the 3D model of the object includes, for example, moving image data of the object generated from the captured moving images obtained by the cameras 12-1 to 12-N and 3D shape data representing the 3D shape of the object. The 3D shape data is represented by, for example, a depth image corresponding to a captured moving image captured by the plurality of cameras 12-1 to 12-N, a point cloud representing a three-dimensional position of the object by a set of points, a polygon mesh represented by connections between vertices, or the like.

The cameras 12-1 to 12-N are imaging devices that capture a subject to be extracted as an object and a background thereof under the control of the control device 11. The cameras 12-1 to 12-N supply captured moving images obtained by imaging to the control device 11. The cameras 12-1 to 12-N are arranged so as to surround the subject, for example, to image the same subject. The captured moving images supplied from the cameras 12-1 to 12-N are multi-view moving images including a plurality of captured moving images having different viewpoints for capturing the subject.

In the following description, in a case where it is not necessary to distinguish among the cameras 12-1 to 12-N, the cameras are simply referred to as a camera 12. The same applies to other configurations provided in a plurality of units.

The monitor 13 is a display device that displays a reference moving image as a first moving image under the control of the control device 11. The reference moving image is a moving image to be referred to by a person as a subject at the time of actual imaging. For example, at the time of actual imaging, a moving image serving as a model of an action of a person who is a subject is displayed on the monitor 13 as a reference moving image.

Additionally, the monitor 13 can also perform monitoring display in which a monitoring image is displayed as a reference moving image. The monitoring image is a captured moving image captured in real time by any one of the cameras 12-1 to 12-N. In the monitoring display, a person as a subject can perform a predetermined action while confirming his/her movement.

Additionally, the monitor 13 can also display a moving image representing lines and lyrics as a reference moving image. By displaying the moving image representing lines and lyrics, a person as a subject can act while confirming the lines or sing while confirming the lyrics.

Note that the monitor 13 may be formed by a device such as a smartphone or a tablet terminal (portable terminal) including a display.

Communication between the control device 11 and the cameras 12-1 to 12-N and communication between the control device 11 and the monitor 13 may be directly performed via a cable or the like, or may be performed via a predetermined network such as a local area network (LAN) or the Internet. Additionally, the communication may be wired communication or wireless communication.

Next, an outline of 3D model generation executed by the control device 11 will be described with reference to FIG. 2.

Figure 2:
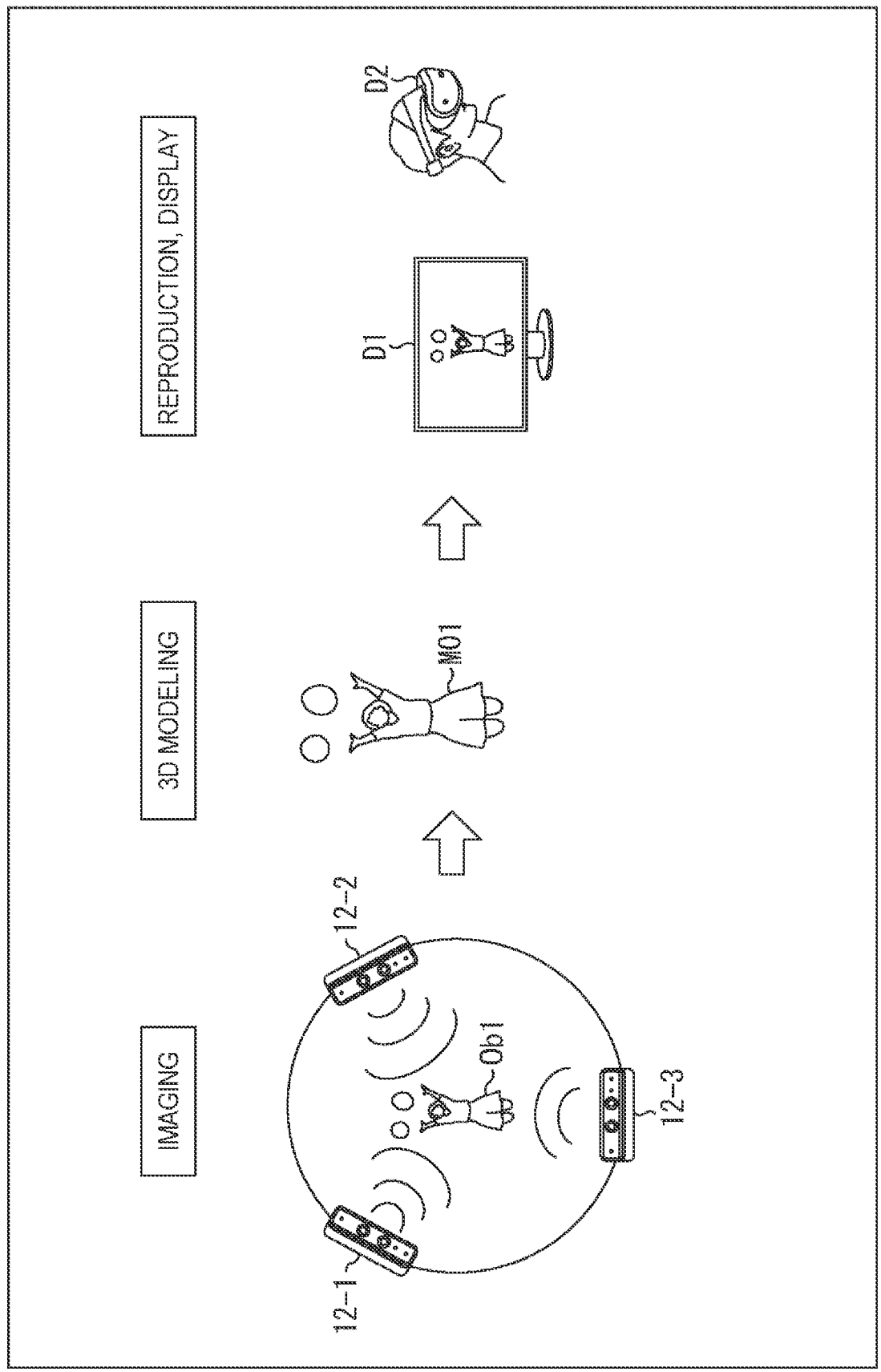
FIG. 2 is a diagram illustrating an outline of 3D model generation executed by a control device.

FIG. 2 illustrates an example in which a person performing a predetermined operation is imaged as a subject Ob1 using three cameras 12. As illustrated on the left side of FIG. 2, the three cameras 12-1 to 12-3 arranged to surround the subject Ob1 image the subject Ob1.

3D modeling is performed by the control device 11 using the captured moving images obtained from the plurality of cameras 12 arranged at different positions, and a 3D model MO1 of the subject Ob1 is generated as illustrated in the center of FIG. 2. The 3D model MO1 is generated by, for example, a method such as visual hull in which a three-dimensional shape is cut out using captured moving images obtained by imaging the subject Ob1 from different directions.

The data (3D model data) of the 3D model of the subject generated as described above is transmitted to a device on the reproduction side and reproduced. That is, in the device on the reproduction side, the 3D model is rendered on the basis of the 3D model data, whereby a 3D shape video is displayed on a viewing device. In FIG. 2, a display D1 and a head mounted display (HMD) D2 are illustrated as the viewing device used by the viewer.

Incidentally, in the generation of the 3D model, it is necessary to separate the subject and the background appearing in each captured moving image and extract data of only the subject. As a method for extracting data of only a subject, keying using a green screen background is known. Additionally, the subject and the background can be separated by obtaining a difference between a background moving image that is a moving image in which only the background is imaged and an actual moving image that is a moving image in which the subject and the background are imaged by foreground/background difference processing.

The imaging system 1 in FIG. 1 performs background imaging that is imaging of a background moving image and actual imaging that is imaging of an actual moving image, and obtains a difference between the background moving image and the actual moving image by foreground/background difference processing, thereby separating a subject and a background. Here, actual imaging is imaging in a situation where the subject is present, whereas background imaging is imaging in a situation where no subject is present. The actual moving image is a second moving image captured by the camera 12 at a predetermined first timing (timing of actual imaging), and the background moving image is a third moving image captured by the camera 12 at a second timing (timing of background imaging) different from the first timing.

Figure 3:
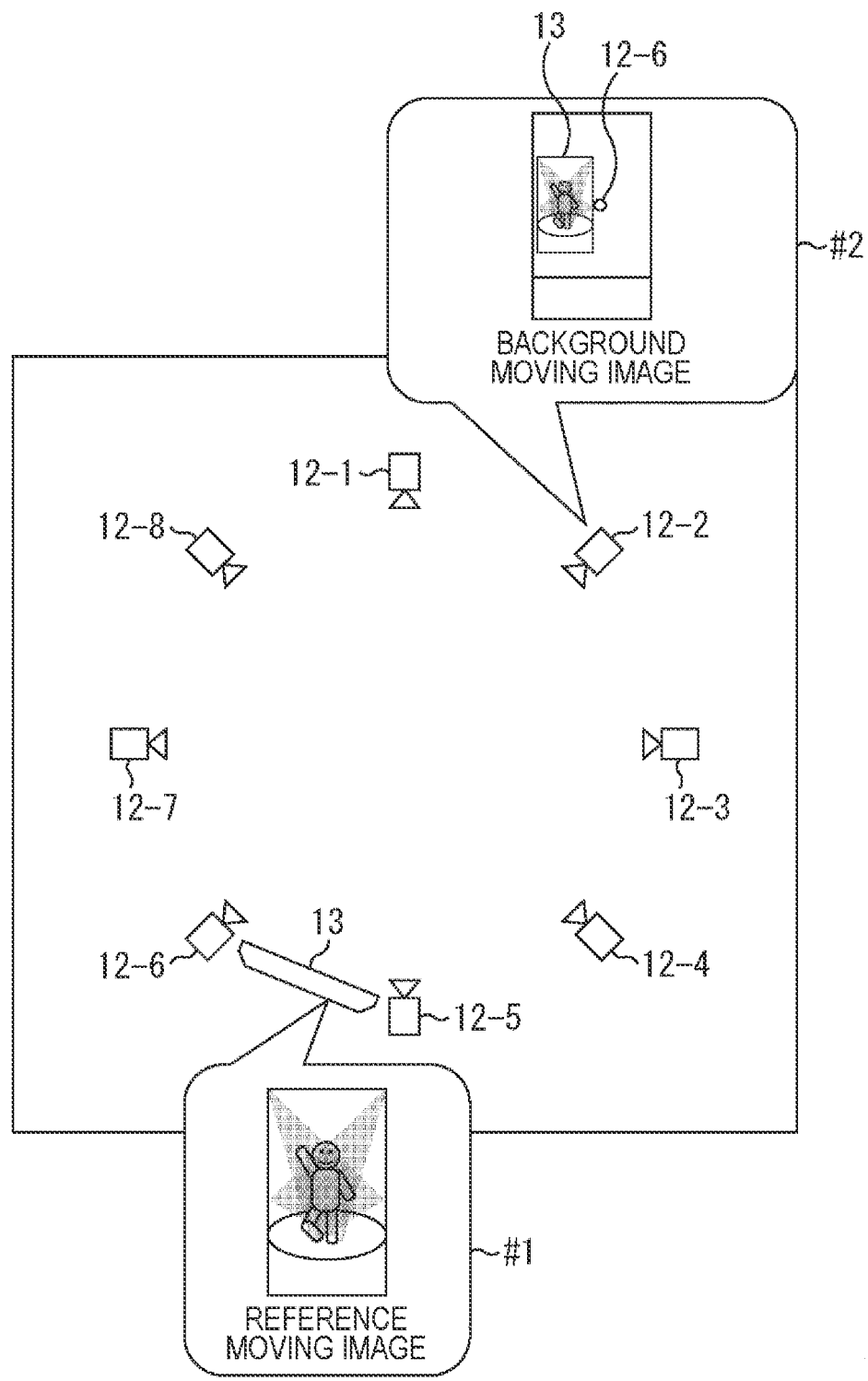
FIG. 3 is a plan view illustrating an example of a situation when the imaging system performs background imaging with N=8.

FIG. 3 is a plan view illustrating an example of a situation when the imaging system 1 performs background imaging with N=8.

In the example of FIG. 3, eight cameras 12-1 to 12-8 are annularly arranged at substantially equal intervals so as to face a central part of an imaging space such as a room. The camera 12-1 and the camera 12-5, the camera 12-2 and the camera 12-6, the camera 12-3 and the camera 12-7, and the camera 12-4 and the camera 12-8 are arranged to face each other.

The monitor 13 is arranged between the camera 12-5 and the camera 12-6 with the front of the monitor 13 facing the center. Here, the monitor 13 is located in an imaging range of the camera 12-2. As illustrated in balloon #1, a moving image in which a person is dancing is displayed on the monitor 13 as a reference moving image.

In this manner, background imaging is performed in a state where no subject is present. In the background moving image captured by each of the cameras 12-1 to 12-8, another camera 12 present in the angle of view, the monitor 13, a wall of the imaging space, a ceiling, a floor, and the like appear as the background.

For example, as illustrated in balloon #2, in the background moving image captured by the camera 12-2, the camera 12-6 appears in the vicinity of the center, and the monitor 13 appears on the left side of the camera 12-6. Since the reference moving image is displayed on the monitor 13 at the time of background imaging, the reference moving image showing a state where a person is dancing is also displayed on the monitor 13 appearing in the background moving image captured by the camera 12-2.

Figure 4:
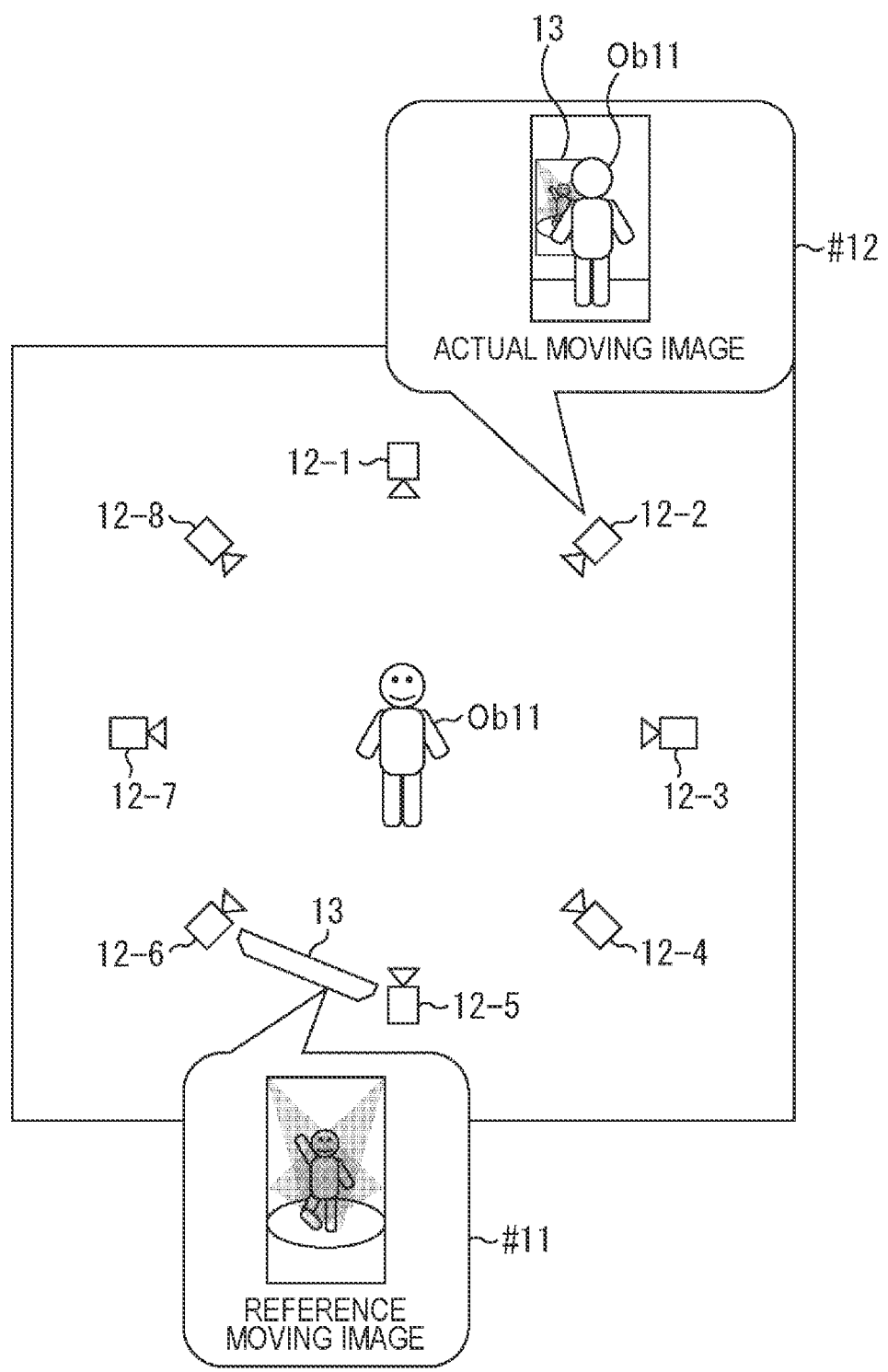
FIG. 4 is a plan view illustrating an example of a situation when the imaging system performs actual imaging with N=8.

FIG. 4 is a plan view illustrating an example of a situation when the imaging system 1 performs actual imaging with N=8.

As illustrated in FIG. 4, the arrangement of the cameras 12-1 to 12-8 and the monitor 13 at the time of actual imaging is similar to the arrangement at the time of background imaging described with reference to FIG. 3.

Actual imaging is performed in a situation where a person as a subject Ob11 is present in the central part of the imaging space. In the actual moving image captured by each of the cameras 12-1 to 12-8, the subject Ob11 present in the angle of view and the background appear. Note that at the time of actual imaging, as illustrated in balloon #11, the same moving image as the moving image displayed at the time of background imaging is displayed on the monitor 13 as the reference moving image.

As illustrated in balloon #12, in the actual moving image captured by the camera 12-2, the subject Ob11 appears in the vicinity of the center, and the monitor 13 appears at a position on the left back side of subject Ob11. Since the reference moving image is displayed on the monitor 13 at the time of actual imaging, the reference moving image showing a state where a person is dancing is also displayed on the monitor 13 appearing in the actual moving image captured by the camera 12-2.

As described above, actual imaging is performed similarly to background imaging except that the imaging is performed by arranging the subject in the central part of the imaging space.

In a case where the subject and the background are separated by foreground/background difference processing, if an object that was not present at the time of background imaging is in the imaging space at the time of actual imaging, the object itself is also treated as a subject.

For example, regarding the time of actual imaging and the time of background imaging, if the reference moving image of the monitor 13 appearing in the actual moving image captured by the camera 12-2 is different from the reference moving image displayed on the monitor 13 at the time of background imaging, the reference moving image of the monitor 13 appearing in the actual moving image is also extracted as a subject.

Against this background, the control device 11 of the imaging system 1 generates a synchronization signal and supplies the synchronization signal to the cameras 12-1 to 12-8 and the monitor 13, thereby performing control so that imaging timings of the cameras 12-1 to 12-8 and a display timing of the monitor 13 are synchronized with each other.

Figure 5:
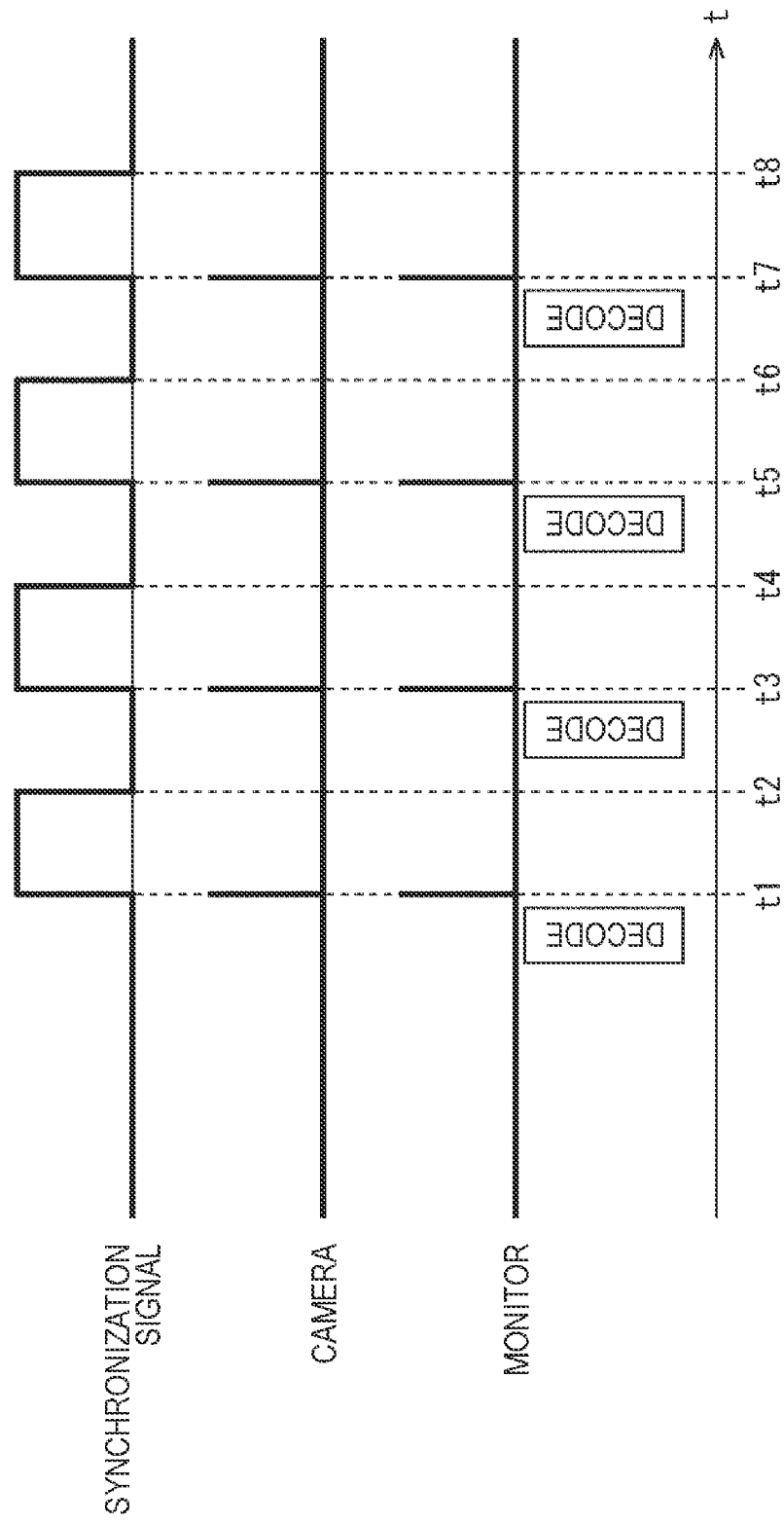
FIG. 5 is a diagram illustrating an example of control of an imaging timing and a display timing based on a synchronization signal.

FIG. 5 is a diagram illustrating an example of control of the imaging timing and the display timing based on a synchronization signal.

At the time of each of background imaging and actual imaging, for example, a synchronization signal as illustrated on the upper side of FIG. 5 is supplied to each of the camera 12 and the monitor 13. The synchronization signal illustrated in FIG. 5 is a pulse signal that alternately repeats 0 (low) and 1 (high) in a predetermined cycle. In the example of FIG. 5, the synchronization signal rises at times t1, t3, t5, t7, ..., and falls at times t2, t4, t6, t8, ....

The camera 12 performs exposure (imaging) for acquiring a frame image included in a moving image (actual moving image or background moving image) at each timing of times t1, t3, t5, and t7 which are the rising times of the synchronization signal.

Additionally, the monitor 13 sequentially displays one or more frame images included in the reference moving image at each timing of times t1, t3, t5, and t7, which are the rising times of the synchronization signal. As described above, the reference moving image is displayed during each of the actual imaging and the background imaging.

Note that the control device 11 decodes the frame image prior to the update timing (display timing) of the frame image displayed on the monitor 13. For example, as illustrated in FIG. 5, a frame image displayed at the timing of time t1 is decoded before time t1. Similarly, the frame image displayed at each timing of the times t3, t5, and t7 is decoded before each timing.

At each of the time of actual imaging and the time of background imaging, the control device 11 generates a synchronization signal and supplies the synchronization signal to the cameras 12-1 to 12-8 and the monitor 13, so that at least a part of the same frame image of the reference moving image appears in frame images of the same frame number of the actual moving image and the background moving image.

Since the same frame image of the reference moving image is included in the frame images of the same frame number of the actual moving image and the background moving image, when the subject and the background are separated by the foreground/background difference processing, the region of the reference moving image displayed on the monitor 13 in the actual moving image can be treated as the background. As a result, it is possible to prevent the reference moving image on the monitor 13 appearing in the actual moving image from being extracted as a subject. Consequently, the imaging system 1 can perform imaging while providing a reference moving image to a person as a subject in imaging for 3D model generation.

Note that while the imaging by the camera 12 and the display of the reference moving image by the monitor 13 are performed at the rising timing of the synchronization signal in the above-described example, the imaging by the camera 12 and the display of the reference moving image by the monitor 13 may be performed at the falling timing of the synchronization signal.

Figure 6:
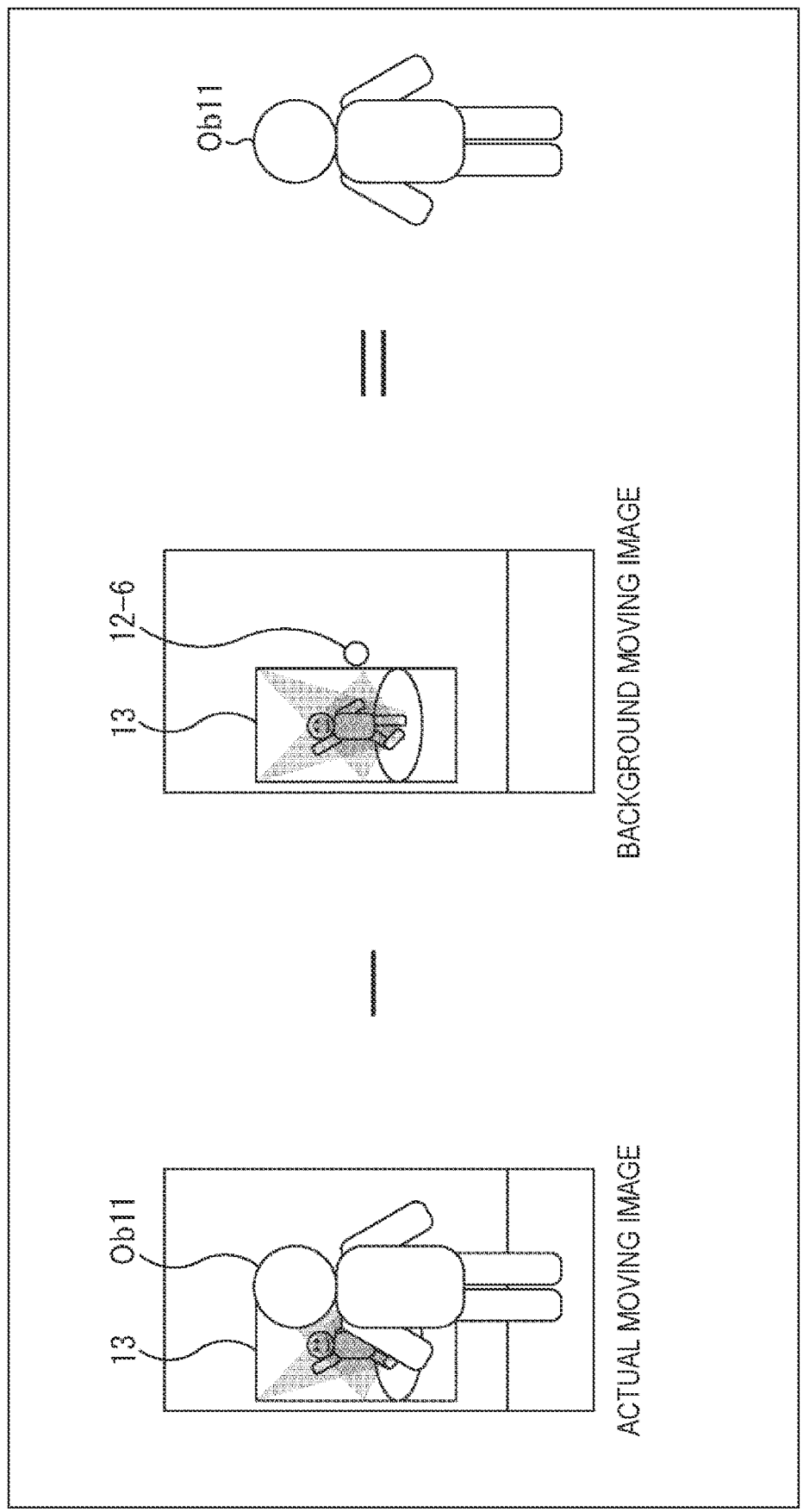
FIG. 6 is a diagram illustrating an example of foreground/background difference processing.

FIG. 6 is a diagram illustrating an example of the foreground/background difference processing.

The actual moving image illustrated on the left side of FIG. 6 is the actual moving image captured by the camera 12-2 described with reference to FIG. 4. Additionally, the background moving image illustrated in the center of FIG. 6 is the background moving image captured by the camera 12-2 described with reference to FIG. 3.

By obtaining the difference between the actual moving image and the background moving image, the control device 11 extracts data of a region in which the subject Ob11 appears as difference data as illustrated on the right side of FIG. 6.

Specifically, the control device 11 compares pixel values of a pixel included in the actual moving image with a pixel of the background moving image at the same pixel position as the pixel included in the actual moving image, and extracts a pixel in the actual moving image in which the difference between the pixel values is equal to or greater than a predetermined threshold as a pixel of the foreground. Such comparison of pixel values is performed for all the pixels included in the actual moving image, and the pixels of the foreground, that is, the pixels included in the subject are generated as the difference data.

The comparison of the pixel values may be performed by comparing RGB values, or may be performed by comparing HSV (hue, saturation, value) values obtained by converting RGB values. In the comparison using the HSV value, it is possible to perform control such that a change in the pixel value in which only the brightness changes and the color (hue) does not change, such as the presence or absence of a shadow, is not extracted as a change. Additionally, difference data may be generated by comparing pixel values of not only one pixel to be compared but also pixels surrounding the pixel to be compared. The threshold used to determine the pixel of the foreground can be appropriately set according to the imaging environment.

The foreground/background difference processing as described above is performed on the actual moving image and the background moving image captured by the plurality of cameras 12, and difference data of the moving images is generated for each camera 12.

As described above, according to the imaging system 1, it is possible to appropriately extract the subject from the actual moving image in which the monitor 13 displaying the reference moving image appears. Even if the image displayed on the monitor 13 changes during imaging, the foreground/background difference processing can be performed without being affected by the change.

<2. Configuration of Imaging System>

Figure 7:
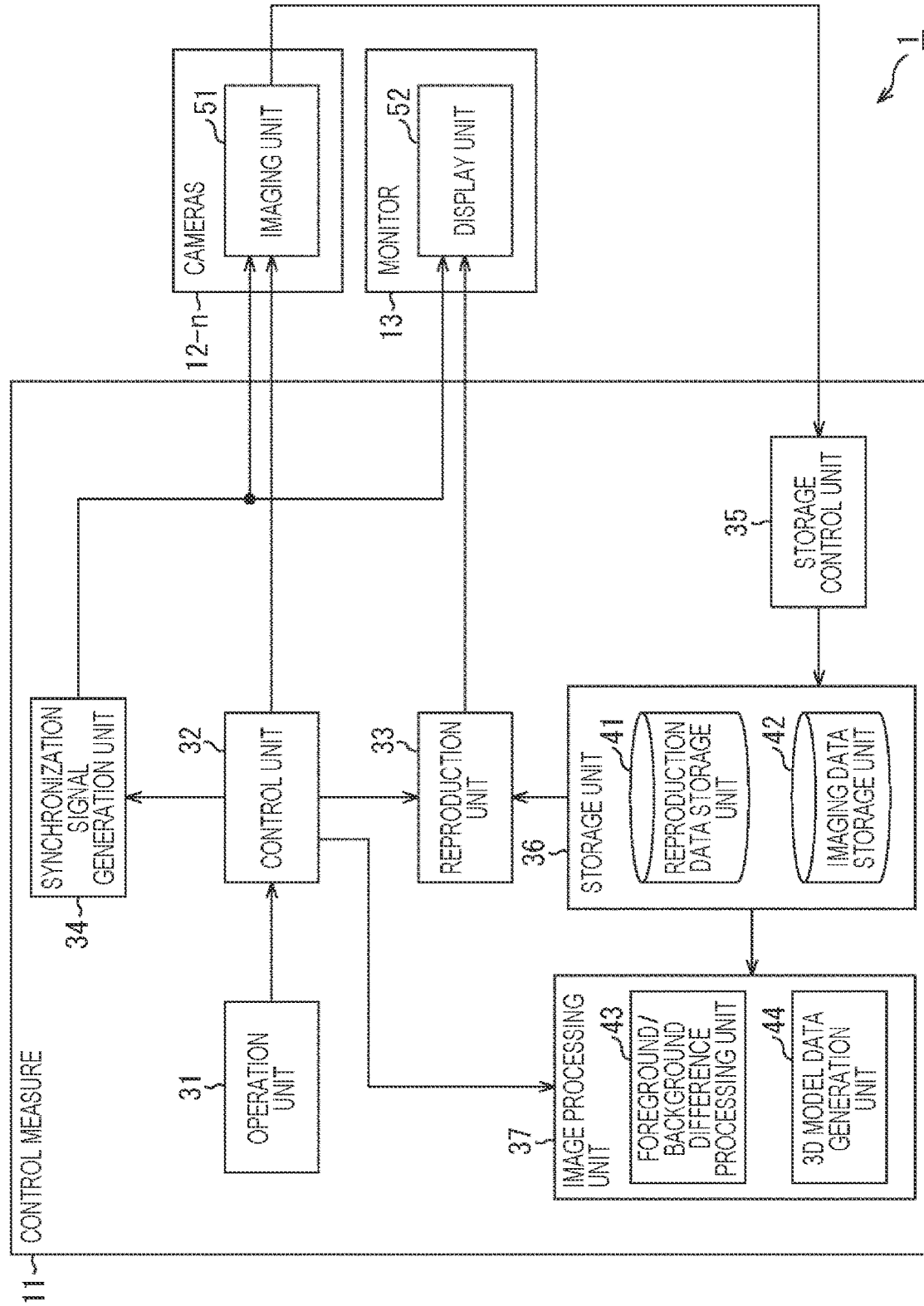
FIG. 7 is a block diagram illustrating a configuration example of the imaging system.

FIG. 7 is a block diagram illustrating a configuration example of the imaging system 1.

The imaging system 1 includes the control device 11, N cameras 12-n (n=1 to N), and the monitor 13. The cameras 12-n are provided with an imaging unit 51. Additionally, the monitor 13 is provided with a display unit 52.

The control device 11 includes an operation unit 31, a control unit 32, a reproduction unit 33, a synchronization signal generation unit 34, a storage control unit 35, a storage unit 36, and an image processing unit 37.

The operation unit 31 includes a touch panel monitor, a keyboard, a mouse, a controller, a remote operation device, and the like. The operation unit 31 detects an operation by an image capturing person or a person as a subject and supplies information indicating the content of the detected operation to the control unit 32.

For example, the operation unit 31 detects an operation for starting background imaging, an operation for starting actual imaging, an operation for generating 3D model data, and the like. An operation for designating a reference moving image displayed on the monitor 13 at the time of background imaging and at the time of actual imaging may be detected by the operation unit 31.

The control unit 32 controls each configuration of the control device 11 and the cameras 12-n on the basis of the information supplied from the operation unit 31.

For example, in a case where an operation for starting actual imaging or background imaging is detected by the operation unit 31, the control unit 32 controls the imaging unit 51 of the cameras 12-n and performs various settings such as setting of a frame rate and resolution of a moving image. Additionally, the control unit 32 performs control to cause the reproduction unit 33 to display a predetermined reference moving image on the monitor 13. Moreover, the control unit 32 performs control to cause the synchronization signal generation unit 34 to generate a synchronization signal.

On the other hand, in a case where an operation for generating 3D model data is detected by the operation unit 31, the control unit 32 performs control to cause the image processing unit 37 to perform 3D model data generation processing.

The reproduction unit 33 acquires and reproduces the reference moving image designated by the control unit 32 from reference moving images stored in the storage unit 36. The reproduction unit 33 decodes the reference moving image prior to the display timing of the monitor 13, and supplies the reference moving image obtained by the decoding to the display unit 52. The decoding of the reference moving image is performed by a method corresponding to an encoding method used when the reference moving image is stored in the storage unit 36. Note that the frame rate of the reference moving image is assumed to be the same as the frame rate when the imaging unit 51 performs actual imaging or background imaging.

The synchronization signal generation unit 34 generates the synchronization signal described with reference to FIG. 5 under the control of the control unit 32, and supplies the synchronization signal to each of the imaging unit 51 and the display unit 52.

The storage control unit 35 encodes the moving image supplied from the imaging unit 51 by a predetermined encoding method such as the MPEG2 method or the AVC method, for example, and stores the encoded moving image in the storage unit 36.

The storage unit 36 includes an auxiliary storage device including an internal or external storage such as a semiconductor memory. The storage unit 36 includes a reproduction data storage unit 41 and an imaging data storage unit 42.

The reproduction data storage unit 41 stores a reference moving image reproduced by the reproduction unit 33.

The imaging data storage unit 42 stores the background moving image and the actual moving image supplied from the storage control unit 35. The imaging data storage unit 42 also stores information regarding the cameras 12-n used for capturing moving images, together with the background moving image and the actual moving image. The information regarding the cameras 12-n includes, for example, internal parameters and external parameters of the cameras 12-n.

Note that the reproduction data storage unit 41 and the imaging data storage unit 42 may be provided as separate storage units in the control device 11.

The image processing unit 37 generates 3D model data of the subject under the control of the control unit 32. The image processing unit 37 includes a foreground/background difference processing unit 43 and a 3D model data generation unit 44.

The foreground/background difference processing unit 43 acquires the actual moving image and the background moving image from the storage unit 36 for each camera 12. The foreground/background difference processing unit 43 performs foreground/background difference processing using the actual moving image and the background moving image to generate difference data. The difference data generated by the foreground/background difference processing unit 43 is supplied to the 3D model data generation unit 44.

The 3D model data generation unit 44 acquires information regarding each camera 12 from the storage unit 36. The 3D model data generation unit 44 generates 3D model data of the subject using a method such as visual hull on the basis of the difference data for each camera 12 and the information regarding each camera 12 supplied from the foreground/background difference processing unit 43. The 3D model data of the subject generated by the 3D model data generation unit 44 is stored in the storage unit 36 or output to an external device.

Note that the image processing unit 37 may be provided not as a part of the control device 11 but as an image processing device different from the control device 11.

The imaging unit 51 of the cameras 12-n captures the actual moving image or the background moving image at an imaging timing based on the synchronization signal supplied from the synchronization signal generation unit 34. The moving image acquired by capturing the actual moving image or the background moving image is supplied to the storage control unit 35 of the control device 11.

The display unit 52 of the monitor 13 displays the reference moving image supplied from the reproduction unit 33 at a display timing based on the synchronization signal supplied from the synchronization signal generation unit 34.

<3. Operation of Imaging System>

Next, an operation of the imaging system 1 will be described with reference to flowcharts of FIGS. 8 to 11.

First, synchronous moving image generation processing of the control device 11 will be described with reference to the flowchart of FIG. 8.

Figure 8:
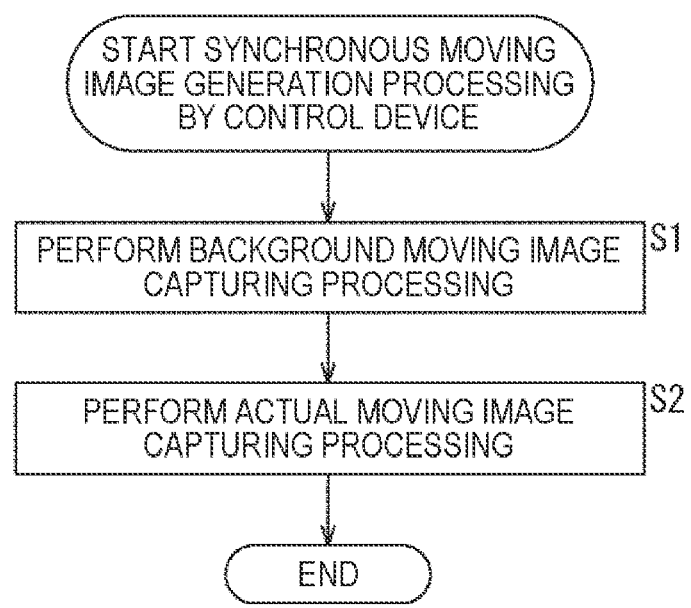
FIG. 8 is a flowchart illustrating synchronous moving image generation processing of the control device.

Synchronous moving image generation processing in FIG. 8 is a series of processing for capturing a background moving image and an actual moving image. The processing is started, for example, when an operation for starting background imaging is detected by the operation unit 31.

In step S1, the control device 11 performs background moving image capturing processing. Background moving image capturing processing is processing of performing moving image capturing processing in FIG. 9 described later in a state where no subject is present in the imaging space. A background moving image is generated by the background moving image capturing processing and stored in the storage unit 36.

Next, when an operation for starting actual imaging is detected by the operation unit 31, in step S2, the control device 11 performs actual moving image capturing processing. Actual moving image capturing processing is processing of performing moving image capturing processing of FIG. 9 described later in a state where a subject exists in the imaging space. An actual moving image is generated and stored in the storage unit 36 by the actual moving image capturing processing. When the background moving image and the actual moving image are stored in the storage unit 36, the synchronous moving image generation processing ends.

Figure 9:
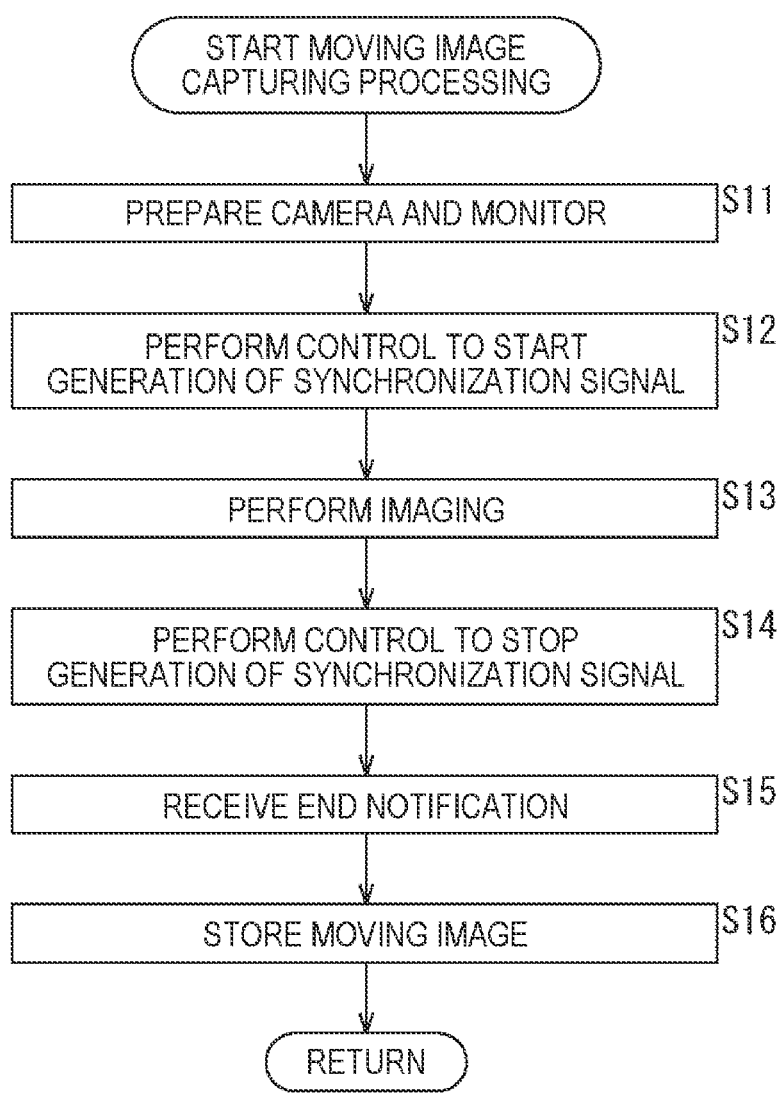
FIG. 9 is a flowchart illustrating moving image capturing processing.

Next, moving image capturing processing performed as processing in step S1 or step S2 in FIG. 8 will be described with reference to the flowchart of FIG. 9.

In step S11, the control unit 32 prepares the camera 12 and the monitor 13. Specifically, the control unit 32 controls the imaging unit 51 to perform various settings such as setting of a frame rate and resolution of a moving image. Additionally, the control unit 32 performs control to cause the reproduction unit 33 to display a reference moving image on the monitor 13. The reproduction unit 33 acquires the reference moving image designated by the control unit 32, decodes the reference moving image, and appropriately supplies a frame image of the reference moving image to the display unit 52.

In step S12, the control unit 32 causes the synchronization signal generation unit 34 to start generating a synchronization signal. Under the control of the control unit 32, the synchronization signal generation unit 34 generates a synchronization signal and supplies the synchronization signal to the imaging unit 51 and the display unit 52 of each camera 12.

In step S13, the imaging unit 51 of each camera 12 captures the background moving image or the actual moving image on the basis of the synchronization signal supplied from the synchronization signal generation unit 34. At the same time, the display unit 52 displays the reference moving image on the basis of the synchronization signal supplied from the synchronization signal generation unit 34.

In step S14, the control unit 32 causes the synchronization signal generation unit 34 to stop generating the synchronization signal. For example, in a case where an operation for ending imaging is detected by the operation unit 31, the processing of step S14 is performed. The flow of processing may be configured such that the processing of step S14 is performed in a case where a predetermined time has elapsed from the start of generation of the synchronization signal.

In step S15, the control unit 32 receives an imaging end notification supplied from the imaging unit 51.

In step S16, the storage control unit 35 stores the moving image captured by each camera 12 in the storage unit 36. That is, the storage control unit 35 encodes the background moving image or the actual moving image captured and supplied by the imaging unit 51 in the processing in step S13 by a predetermined encoding method such as the MPEG2 method or the AVC method, for example, and stores the encoded moving image in the storage unit 36.

Thus, the moving image capturing processing performed as the processing of step S1 or step S2 in FIG. 8 ends. The difference between the background moving image capturing processing of step S1 and the actual moving image capturing processing of step S2 in FIG. 8 is whether or not the processing is performed in a state where a subject exists in the imaging space.

Figure 10:
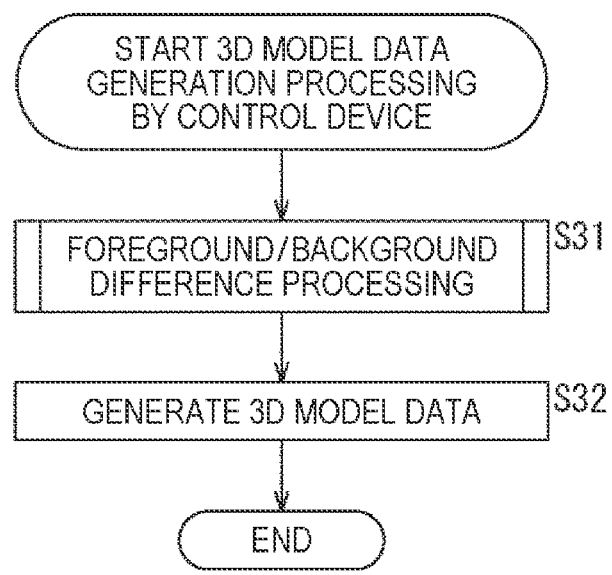
FIG. 10 is a flowchart illustrating subject 3D model data generation processing by the control device.

Next, subject 3D model data generation processing by the control device 11 will be described with reference to the flowchart of FIG. 10. The processing is started, for example, when an operation for generating 3D model data of the subject is detected by the operation unit 31.

First, in step S31, the foreground/background difference processing unit 43 performs foreground/background difference processing for each actual moving image captured by each camera 12. Difference data of the moving image for each camera 12 is generated by the foreground/background difference processing. Note that details of the foreground/background difference processing will be described later with reference to the flowchart of FIG. 11.

In step S32, the 3D model data generation unit 44 generates 3D model data of the subject on the basis of the difference data of the moving image for each camera 12.

Details of the foreground/background difference processing performed in step S31 of FIG. 10 will be described with reference to the flowchart of FIG. 11.

In step S41, the foreground/background difference processing unit 43 reads one predetermined frame image among a plurality of frame images included in the actual moving image from the storage unit 36. For example, the foreground/background difference processing unit 43 sequentially reads a plurality of frame images included in the actual moving image frame by frame from the first frame image in the processing of step S41 repeatedly performed as described later.

In step S42, the foreground/background difference processing unit 43 reads a frame image of the background moving image having the same frame number as the frame image of the actual moving image read in step S41 from the storage unit 36 among the plurality of frame images included in the background moving image.

In step S43, the foreground/background difference processing unit 43 sets a predetermined pixel among the plurality of pixels included in the frame image of the actual moving image read from the storage unit 36 as a processing target pixel, and calculates a difference in pixel value between the processing target pixel and a pixel corresponding to the processing target pixel among the pixels included in the frame image of the background moving image. Then, the foreground/background difference processing unit 43 determines whether or not the calculated difference between pixel values is equal to or greater than a predetermined threshold.

If it is determined in step S43 that the difference between pixel values is equal to or greater than the predetermined threshold, the processing proceeds to step S44, and the foreground/background difference processing unit 43 sets the processing target pixel as a foreground pixel.

On the other hand, if it is determined in step S43 that the difference between pixel values is less than the predetermined threshold, the processing proceeds to step S45, and the foreground/background difference processing unit 43 sets the processing target pixel as a background pixel.

In step S46, the foreground/background difference processing unit 43 determines whether or not there is a next pixel to be set as a processing target pixel among the pixels of the frame image of the actual moving image read in step S41. In step S46, in a case where all the pixels of the frame image of the actual moving image read in step S41 are set as processing target pixels, it is determined that there is no next pixel to be set as a processing target pixel, and in a case where not all the pixels have been set as processing target pixels yet, it is determined that there is a next pixel to be set as a processing target pixel.

If it is determined in step S46 that there is a next pixel, the processing returns to step S43, a pixel that has not yet been set as a processing target pixel is set as a processing target pixel, and the subsequent processing is performed.

On the other hand, if it is determined in step S46 that there is no next pixel, the processing proceeds to step S47, and the foreground/background difference processing unit 43 generates a frame image of only the foreground. That is, in step S47, a frame image in which only the pixels set as foreground pixels are collected in the frame image of the actual moving image read in step S41 is generated. For example, a fixed pixel value such as 0 is stored in the pixel set as a background pixel.

Next, in step S48, the foreground/background difference processing unit 43 determines whether there is a next frame image, that is, whether or not there is a frame image for which generation of a frame image of only the foreground has not yet been performed in the actual moving image.

If it is determined in step S48 that there is a next frame image, the processing returns to step S41, the frame image of the actual moving image for which generation of the frame image of only the foreground has not yet been performed is read as the next frame image, and the subsequent processing is performed.

On the other hand, if it is determined in step S48 that there is no next frame image, the processing proceeds to step S49, and the foreground/background difference processing unit 43 generates difference data of the moving image. That is, the foreground/background difference processing unit 43 generates difference data of the moving image by arranging the frame images of only the foreground generated by the repeatedly performed processing in step S47 in the same order as the frame images of the actual moving image.

Figure 11:
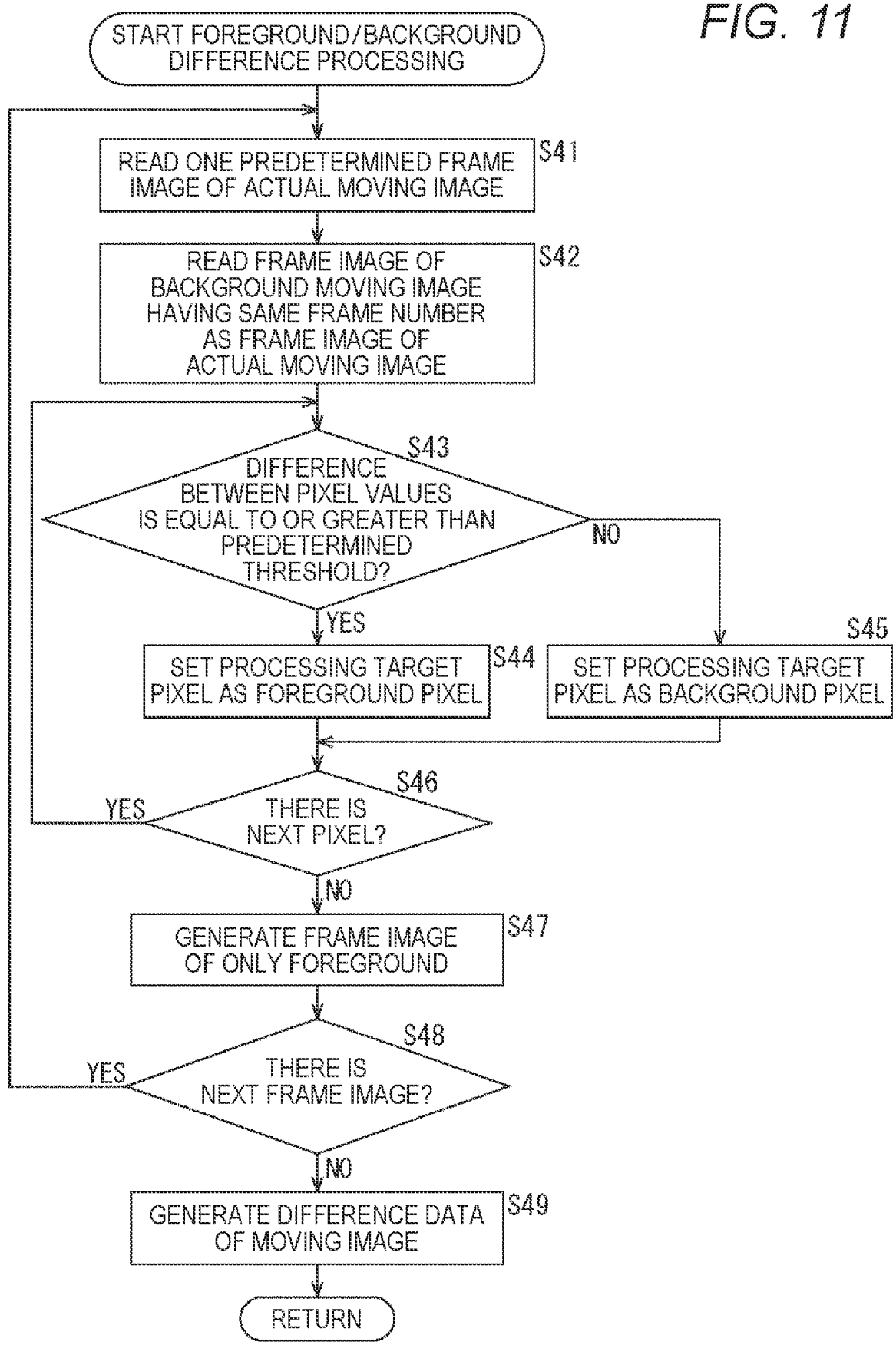
FIG. 11 is a flowchart illustrating details of the foreground/background difference processing.

Thus, the foreground/background difference processing in FIG. 11 ends. The foreground/background difference processing in FIG. 11 is performed on each of the actual moving images captured by the plurality of cameras 12. The foreground/background difference processing may be performed by sequentially selecting the actual moving images corresponding to the cameras 12 one by one, or the foreground/background difference processing may be performed by simultaneously selecting two or more or all of the actual moving images. After the difference data of the moving image is generated for all the actual moving images corresponding to all the cameras 12, the processing returns to step S31 of FIG. 10, and the processing of step S31 and subsequent step is performed.

According to the imaging system 1 described above, a person as a subject can perform imaging while confirming a reference moving image displayed on the monitor 13 at the time of actual imaging. At that time, it is possible to prevent the moving image displayed on the monitor 13 from being extracted as a subject.

<4. Processing when Performing Monitoring Display>

Next, a case where the imaging system 1 captures a moving image while performing monitoring display will be described.

In a case where the imaging system 1 performs monitoring display, as described above, the moving image captured by the camera 12 is displayed on the monitor 13 in real time as a reference moving image. That is, at the time of actual imaging, the actual moving image being captured is displayed as it is on the monitor 13 as a reference moving image.

In this case, since the actual moving image displayed as a reference moving image on the monitor 13 is required at the time of background imaging, the actual imaging is performed before the background imaging, and the background imaging is performed after the actual imaging. At the time of background imaging, the actual moving image displayed on the monitor 13 at the time of actual imaging and stored in the control device 11 is displayed as a reference moving image.

<Configuration of Imaging System 1>

Figure 12:
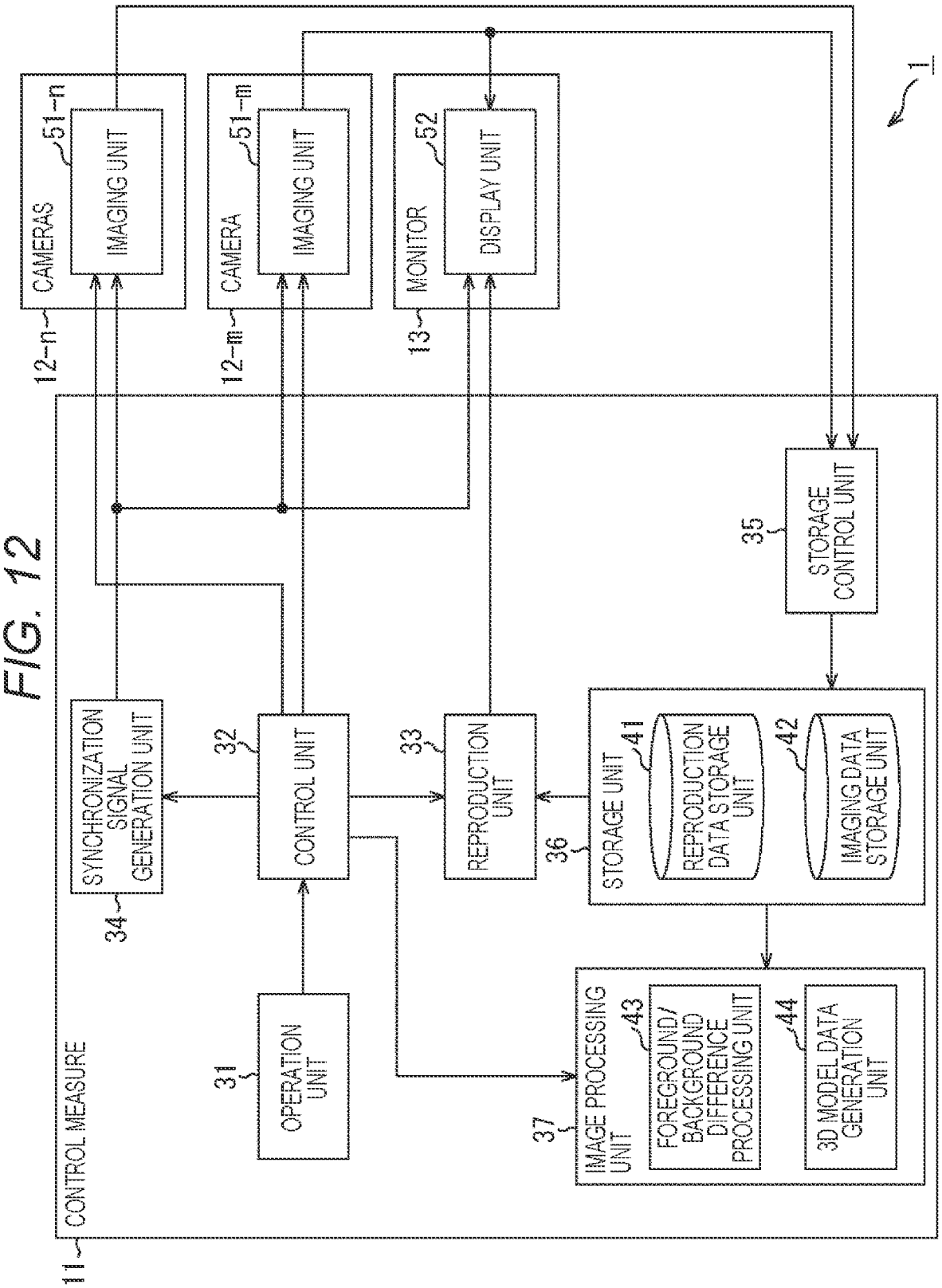
FIG. 12 is a block diagram illustrating a configuration example of an imaging system in a case where monitoring display is performed.

FIG. 12 is a block diagram illustrating a configuration example of the imaging system 1 in a case where monitoring display is performed.

In FIG. 12, the same configurations as those of the imaging system 1 in FIG. 7 are denoted by the same reference numerals, and redundant description will be omitted as appropriate.

The configuration of an imaging system 1 illustrated in FIG. 12 is different from the configuration of the imaging system 1 described with reference to FIG. 7 in that the actual moving image obtained by a camera 12-m is supplied to the display unit 52.

The camera 12-m (m is any one of 1 to N) is a camera that captures an actual moving image as a reference moving image displayed on a monitor 13. The same synchronization signal as that of a camera 12-n (n is 1 to N excluding m) is supplied from a synchronization signal generation unit 34 to the camera 12-m.

Similarly to the cameras 12-n, the camera 12-m is provided with an imaging unit 51-m. The imaging unit 51-m captures an actual moving image or a background moving image at an imaging timing based on the synchronization signal supplied from the synchronization signal generation unit 34. At the time of actual imaging, the actual moving image captured by the imaging unit 51-m is supplied to a storage control unit 35 and a display unit 52. At the time of background imaging, the background moving image captured by the imaging unit 51-m is not supplied to the display unit 52 but is supplied to the storage control unit 35.

At the time of actual imaging, the display unit 52 displays the actual moving image supplied from the imaging unit 51-m as a reference moving image at a display timing based on the synchronization signal supplied from the synchronization signal generation unit 34. On the other hand, at the time of background imaging, the display unit 52 displays the reference moving image supplied from a reproduction unit 33 at a display timing based on the synchronization signal supplied from the synchronization signal generation unit 34. The reference moving image supplied from the reproduction unit 33 is the same as the actual moving image supplied from the imaging unit 51-m at the time of actual imaging.

A control unit 32 controls the camera 12-m similarly to the case of the cameras 12-n on the basis of the information supplied from an operation unit 31. In a case where an operation for starting actual imaging or background imaging is detected by the operation unit 31, the control unit 32 controls the imaging unit 51-m and the imaging unit 51-n, and performs various settings such as setting of a frame rate and resolution of a moving image.

Additionally, at the time of actual imaging, the control unit 32 does not cause the reproduction unit 33 to reproduce a predetermined moving image since the actual moving image captured by the imaging unit 51-*m* is displayed on the monitor 13 as a reference moving image. In other words, the control unit 32 causes the reproduction unit 33 to not reproduce a predetermined moving image at the time of actual imaging. On the other hand, at the time of background imaging, the control unit 32 performs control to cause the reproduction unit 33 to display the actual moving image displayed on the monitor 13 at the time of actual imaging on the monitor 13 again as a reference moving image.

At the time of actual imaging, under the control of the control unit 32, the reproduction unit 33 does not reproduce the predetermined moving image. On the other hand, at the time of background imaging, the reproduction unit 33 acquires the actual moving image designated by the control unit 32 (actual moving image captured by imaging unit 51-*m*) from the actual moving images stored in the storage unit 36, and reproduces the acquired actual moving image. Similarly to FIG. 7, the reproduction unit 33 decodes the reference moving image prior to the display timing of the monitor 13 and supplies the actual moving image as a reference moving image to the display unit 52.

A storage control unit 35 encodes the moving images supplied from the imaging units 51-*m* and 51-*n* by a predetermined encoding method, and stores the encoded moving images in the storage unit 36.

A reproduction data storage unit 41 stores the actual moving image captured by the imaging unit 51-*m* as a reference moving image.

<Operation of Control Device 11>

Next, the synchronous moving image generation processing of the control device 11 in the case of performing the monitoring display will be described with reference to a flowchart of FIG. 13.

Figure 13:
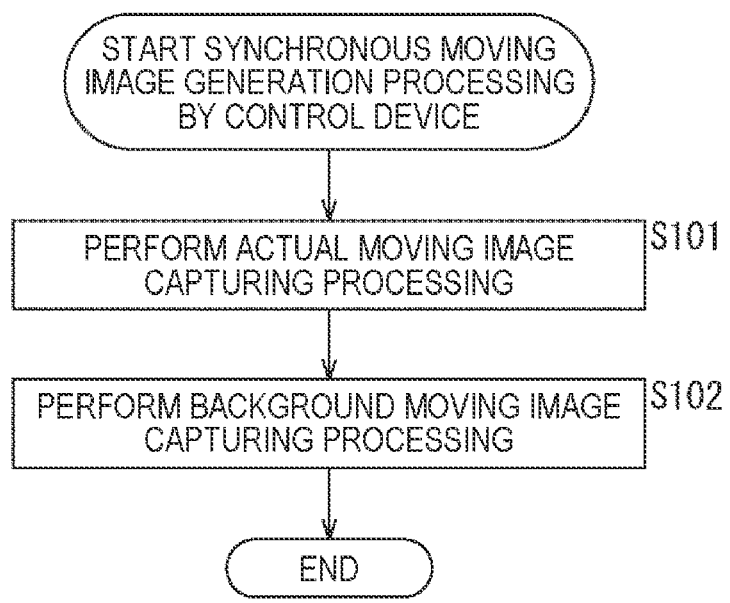
FIG. 13 is a flowchart illustrating synchronous moving image generation processing of the control device in a case where monitoring display is performed.

The synchronous moving image generation processing in FIG. 13 is started, for example, when an operation for starting actual imaging is detected by an operation unit 31.

First, in step S101, the control device 11 performs actual moving image capturing processing. In the processing of step S101, the moving image capturing processing of FIG. 9 is performed in a state where the actual moving image captured by the camera 12-*m* is displayed on the monitor 13 and the subject is present in the imaging space. The actual moving image captured by each camera 12 is stored in the storage unit 36 by the actual moving image capturing processing.

Next, when an operation for starting background imaging is detected by the operation unit 31, in step S102, the control device 11 performs background moving image capturing processing. In the processing of step S102, the actual moving image displayed on the monitor 13 in the processing of step S101 is displayed on the monitor 13 as a reference moving image, and the moving image capturing processing of FIG. 9 is performed in a state where no subject is present in the imaging space. The background moving image captured by each camera 12 is stored in the storage unit 36 by the background moving image capturing processing.

3D model data of the subject is generated using the actual moving image and the background moving image generated by the synchronous moving image generation processing in FIG. 13. Note that the processing of generating the 3D model data of the subject is similar to the subject 3D model data generation processing illustrated in FIG. 10, and thus the description thereof will be omitted.

According to the imaging system 1 described above, it is possible to generate moving images necessary for generating 3D model data while a person as a subject confirms his/her own movement at the time of actual imaging. At that time, it is possible to prevent the moving image displayed on the monitor 13 from being extracted as a subject.

<5. Modification>

<Example in which Time Code is Displayed>

At the time of each of actual imaging and background imaging, a control unit 32 can perform control so that information indicating a time code is displayed on a monitor 13 together with a reference moving image.

In this case, it is possible to confirm whether the time code of the moving image itself captured by a camera 12 matches the time code appearing in the moving image captured by the camera 12. As a result, it is possible to easily confirm synchronization between the imaging timing of the camera 12 and the display timing of the monitor 13.

<Example of Arranging a Plurality of Monitors 13>

There are cases where actual imaging is performed in a state where a plurality of persons exists as subjects, and where actual imaging is performed in a state where persons as subjects face various directions. In these cases, it is preferable that a plurality of monitors 13 is arranged in the imaging space.

Figure 14:
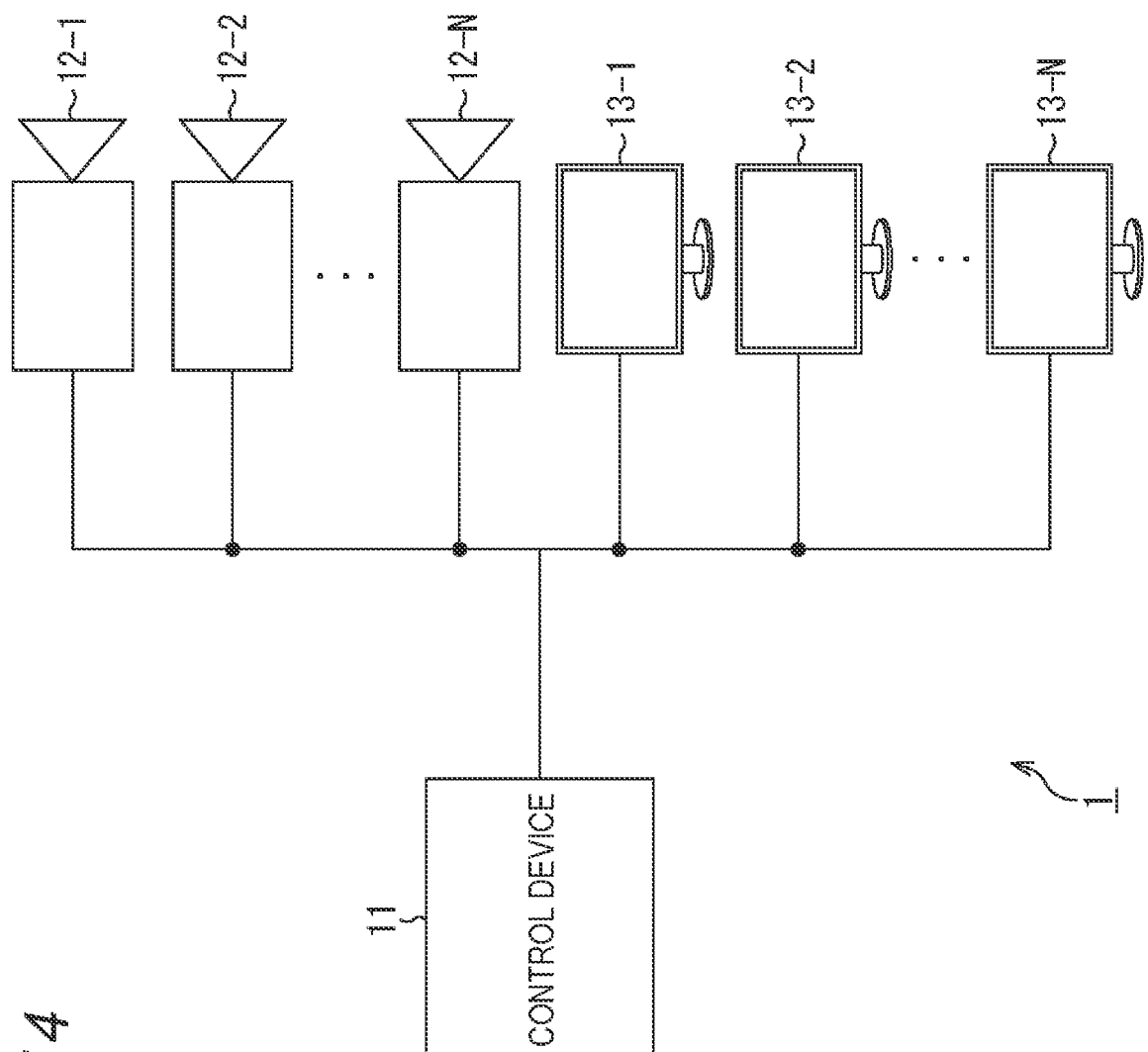
FIG. 14 is a diagram illustrating another configuration example of the imaging system.

FIG. 14 is another configuration example of the imaging system 1, and is a diagram illustrating a configuration example of an imaging system 1 in a case where a plurality of monitors 13 is arranged in the imaging space.

The imaging system 1 in FIG. 14 includes a control device 11, N cameras 12-1 to 12-N, and N monitors 13-1 to 13-N. The cameras 12-1 to 12-N and the monitors 13-1 to 13-N are arranged in the same imaging space.

The monitors 13-1 to 13-N may display different reference moving images, or may display the same reference moving image.

Even in a case where a plurality of monitors 13 is provided, the imaging timings of the cameras 12-1 to 12-N and the display timings of the monitors 13-1 to 13-N are controlled to be synchronized on the basis of a synchronization signal generated by the control device 11.

Figure 15:
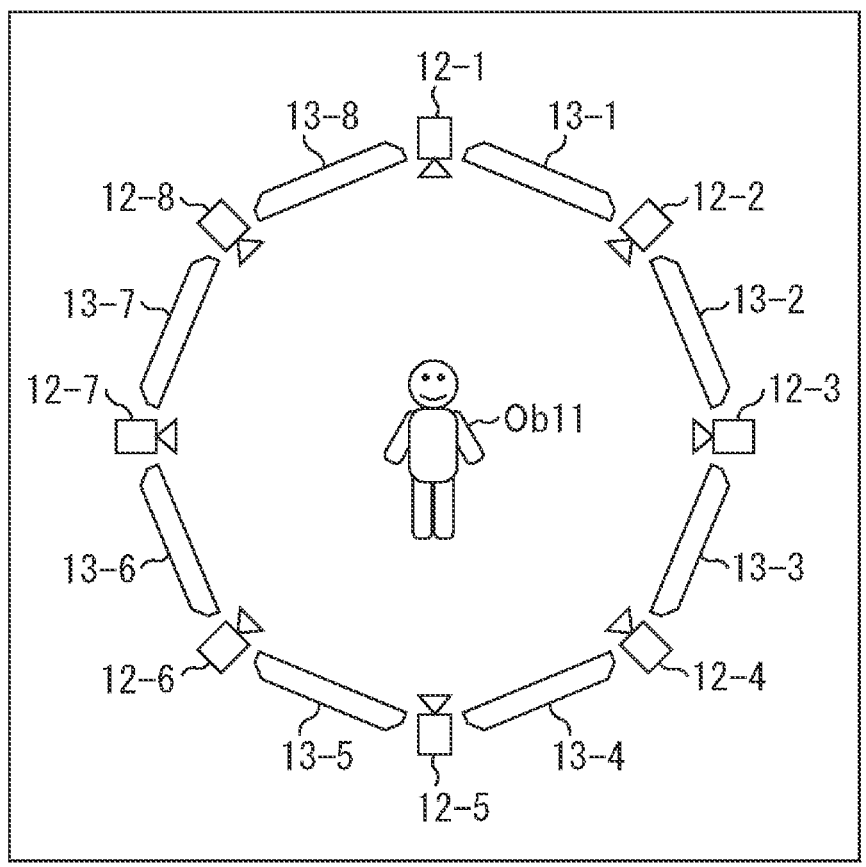
FIG. 15 is a plan view illustrating a situation at the time of actual imaging in the imaging system in FIG. 14 with N=8.

FIG. 15 is a plan view illustrating a situation at the time of actual imaging in the imaging system 1 of FIG. 14 with N=8.

In the example of FIG. 15, eight cameras 12-1 to 12-8 and eight monitors 13-1 to 13-8 are alternately arranged in an annular shape.

The monitors 13-1 to 13-8 are arranged between the camera 12-1 and the camera 12-2, between the camera 12-2 and the camera 12-3, between the camera 12-3 and the camera 12-4, between the camera 12-4 and the camera 12-5, between the camera 12-5 and the camera 12-6, between the camera 12-6 and the camera 12-7, between the camera 12-7 and the camera 12-8, and between the camera 12-8 and the camera 12-1 with the front facing the center.

Note that in the examples of FIGS. 14 and 15, an example in which the same number of monitors 13 as the number of cameras 12 is provided in the imaging system 1 has been described. However, the number of monitors 13 may be different from the number of cameras 12 in the imaging system 1.

As described above, even in a case where a plurality of monitors 13 is provided, the control device 11 can separate only a person assumed as a subject, for example, from an actual moving image as the foreground by performing the foreground/background difference processing using the actual moving image and the background moving image. At this time, the imaging timings of the cameras 12-1 to 12-N and the display timings of the monitors 13-1 to 13-N are controlled to be synchronized on the basis of the synchronization signal, so that it is possible to prevent the reference moving images on the monitors 13-1 to 13-N appearing in the actual moving image from being extracted as a subject.

<Example in which Synchronization Signal Generation Device is Provided>

While the synchronization signal generation unit 34 is provided in the control device 11 in the imaging system 1 of FIG. 7, the function of the synchronization signal generation unit 34 may be implemented by a device outside the control device 11.

Figure 16:
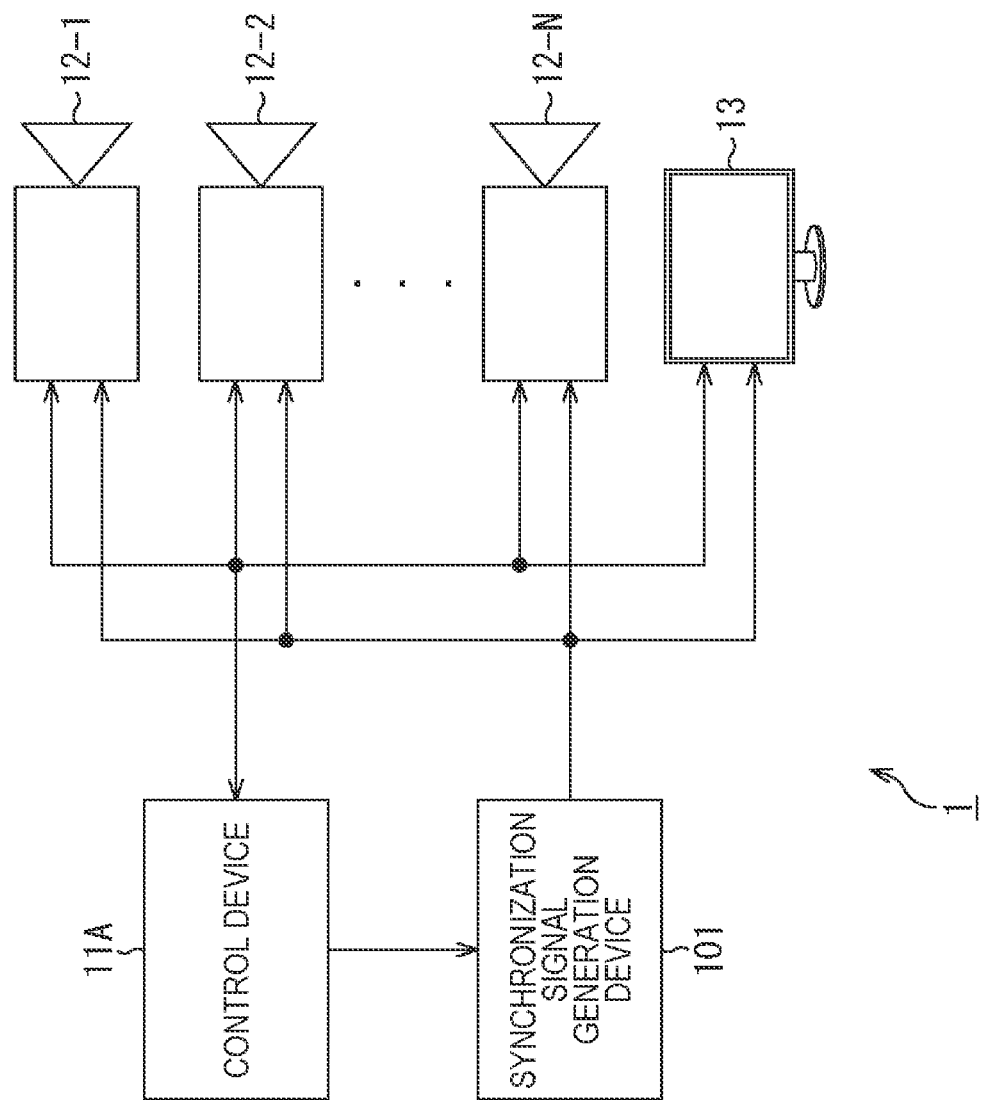
FIG. 16 is a diagram illustrating still another configuration example of the imaging system.

FIG. 16 is a diagram illustrating still another configuration example of the imaging system 1, and is a diagram illustrating a configuration example of the imaging system 1 in a case where the function of the synchronization signal generation unit 34 is a separate device.

An imaging system 1 illustrated in FIG. 16 is configured by connecting a control device 11A, cameras 12-1 to 12-N, a monitor 13, and a synchronization signal generation device 101 directly or via a network.

The synchronization signal generation device 101 is provided with the configuration of the synchronization signal generation unit 34 in FIG. 7. That is, the synchronization signal generation device 101 generates a synchronization signal under the control of the control device 11 and supplies the synchronization signal to each of the cameras 12-1 to 12-N and the monitor 13. The control device 11A is configured by removing the synchronization signal generation unit 34 from the control device 11 in FIG. 7.

As described above, a part of the configuration provided in the control device 11 may be provided outside the control device 11.

<Example of Performing Frame Rate Conversion>

In each of the above-described embodiments, the description has been given on the assumption that the frame rate when the camera 12 performs actual imaging or background imaging is the same as the frame rate when the reproduction unit 33 reproduces the reference moving image. However, in some cases, the frame rate of the reference moving image may be different from the frame rate at which the camera 12 performs imaging. In that case, the control unit 32 can designate the frame rate to the reproduction unit 33, and the reproduction unit 33 can convert the reference moving image designated from the control unit 32 to the designated frame rate, reproduce the reference moving image, and supply the reference moving image to the display unit 52.

Additionally, for example, in a case where the lines or lyrics to be displayed on the monitor 13 as a reference moving image is not a moving image but includes one or more still images, the reproduction unit 33 can convert the still images into a moving image having a frame rate designated by the control unit 32 and supply the moving image to the display unit 52.

<6. Configuration Example of Computer>

The series of processing described above can be performed by hardware or software. In a case where the series of processing is performed by software, a program forming the software is installed from a program recording medium to a computer incorporated in dedicated hardware, a general-purpose personal computer, or the like.

Figure 17:
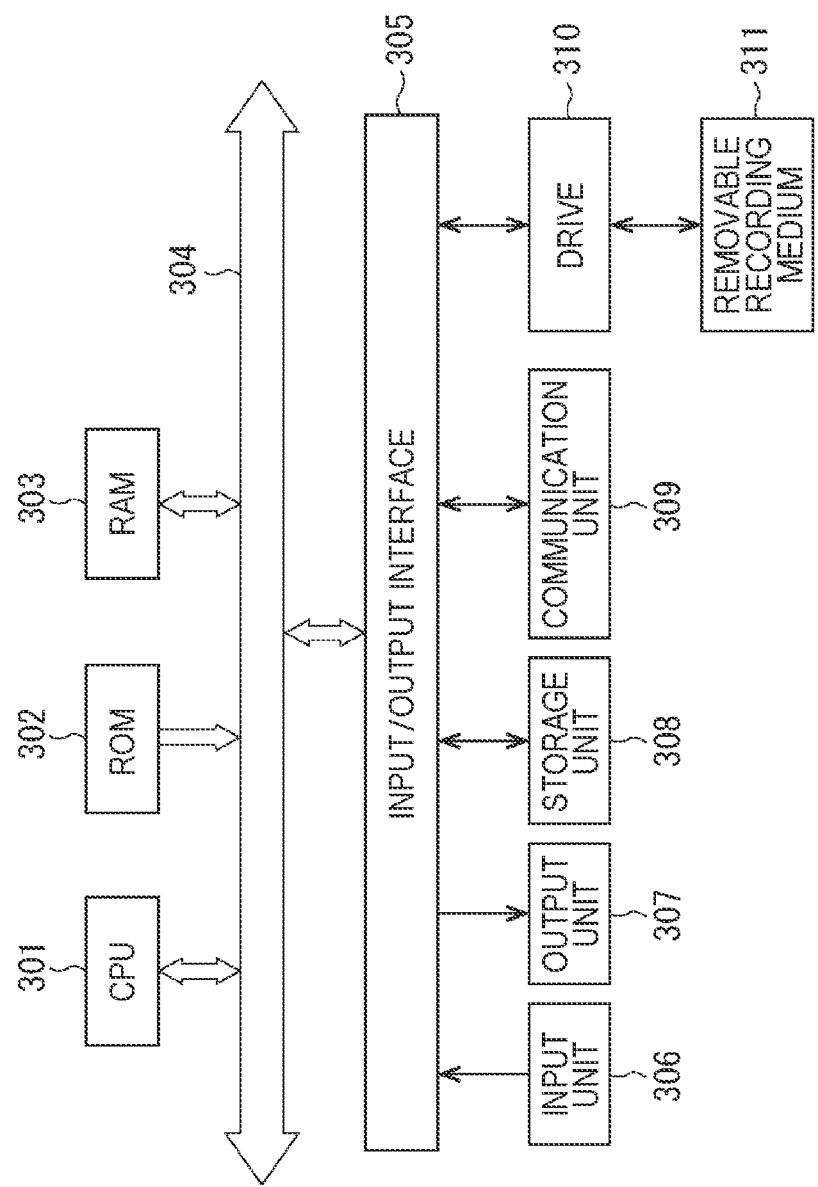
FIG. 17 is a block diagram illustrating a configuration example of hardware of a computer.

FIG. 17 is a block diagram illustrating a hardware configuration example of a computer that performs the series of processing described above according to a program.

A central processing unit (CPU) 301, a read only memory (ROM) 302, and a random access memory (RAM) 303 are mutually connected via a bus 304.

An input/output interface 305 is also connected to the bus 304. An input unit 306, an output unit 307, a storage unit 308, a communication unit 309, and a drive 310 are connected to the input/output interface 305.

The input unit 306 includes a keyboard, a mouse, a microphone, a touch panel, an input terminal, and the like. The output unit 307 includes a display, a speaker, an output terminal, and the like. The storage unit 308 includes a hard disk, a RAM disk, a nonvolatile memory, and the like. The communication unit 309 includes a network interface and the like. The drive 310 drives a removable recording medium 311 such as a magnetic disk, an optical disk, a magneto-optical disk, or a semiconductor memory.

In the computer configured as described above, the CPU 301 loads a program stored in the storage unit 308 onto the RAM 303 through the input/output interface 305 and the bus 304, and executes the program to perform the above-described series of processing, for example. The RAM 303 also appropriately stores data and the like necessary for the CPU 301 to perform various processing.

The program executed by the computer (CPU 301) can be provided by being recorded on the removable recording medium 311 such as a package medium, for example. Additionally, the program can be provided through a wired or wireless transmission medium such as a local area network, the Internet, or digital satellite broadcasting.

In the computer, the program can be installed in the storage unit 308 through the input/output interface 305 by attaching the removable recording medium 311 to the drive 310. Additionally, the program can be received by the communication unit 309 through a wired or wireless transmission medium and be installed in the storage unit 308. In addition, the program can be installed in advance in the ROM 302 or the storage unit 308.

Note that in the specification, steps described in the flowcharts may be performed chronologically according to the described order, as a matter of course, but does not necessarily have to be processed in chronological order, and may be performed in parallel or at a necessary timing such as when a call is made.

Note that in the present specification, a system means a collection of a plurality of components (devices, modules (parts), and the like), and it does not matter whether or not all the components are in the same case. Accordingly, a plurality of devices housed in separate cases and connected through a network, and one device housing a plurality of modules in one case are both systems.

Note that the effect described in the present specification is merely an illustration and is not restrictive. Hence, other effects can be obtained.

Embodiments of the present technology are not limited to the above-described embodiments, and various modifications can be made without departing from the gist of the present technology.

For example, the present technology can have a cloud computing configuration in which one function is shared and processed by a plurality of devices through a network.

Additionally, each step described in the above-described flowchart can be executed by one device or be executed in a shared manner by a plurality of devices.

Moreover, in a case where a plurality of processing is included in one step, the plurality of processing included in one step can be performed by one device or be performed in a shared manner by a plurality of devices.

<Exemplary Combination of Configuration>

The present technology can also be configured as follows.

(1)

A control device including a control unit that performs control to synchronize an imaging timing at which an imaging device performs imaging with a display timing at which a display device located in an imaging range of the imaging device displays a first moving image, and an image processing unit that performs the foreground/background difference processing on the basis of a second moving image captured by the imaging device at a first timing and a third moving image captured by the imaging device at a second timing different from the first timing, in which the second moving image and the third moving image both include at least a part of the first moving image whose display timing is synchronized between the second moving image and the third moving image.

(2)

The control device according to (1) above, in which:

the second moving image is an actual moving image which is a moving image including a subject and a background;

the third moving image is a background moving image which is a moving image including the background; and the image processing unit performs the foreground/background difference processing using the background moving image and the actual moving image.

(3)

The control device according to (2) above, in which the first moving image is a reference moving image to be referred to when the actual moving image is captured, and the control unit further performs control to cause the display device to display the reference moving image.

(4)

The control device according to (3) above, in which the reference moving image is a moving image read from a predetermined storage unit and reproduced.

(5)

The control device according to (4) above further including a reproduction unit that reproduces the reference moving image stored in the predetermined storage unit, in which the reproduction unit decodes the reference moving image prior to the display timing of the display device.

(6)

The control device according to (3) above, in which the reference moving image is a moving image captured by the imaging device in capturing the actual moving image.

(7)

The control device according to any one of (3) to (6) above, in which the control unit causes the display device to display the same reference moving image at the first timing and the second timing.

(8)

The control device according to (7) above, in which the control unit causes the display device to display a frame image of the same reference moving image for the same frame number of the actual moving image and the background moving image when imaging the actual moving image and the background moving image.

(9)

The control device according to any one of (1) to (8) above, in which the control unit generates a synchronization signal, causes the imaging device to perform imaging at a rising or falling timing of the synchronization signal, and causes the display device to display the first moving image.

(10)

The control device according to any one of (1) to (9) above, in which the control unit performs control to synchronize an imaging timing at which a plurality of the imaging devices performs imaging with a display timing at which a plurality of the display devices displays the first moving image.

(11)

The control device according to (10) above, in which the control unit causes the plurality of the display devices to display different first moving images respectively.

(12)

The control device according to any one of (1) to (11) above, in which the control unit further performs control to cause the display device to display information indicating a time code together with the first moving image.

(13)

The control device according to (9) above further including a synchronization signal generation unit that generates the synchronization signal on the basis of control of the control unit.

(14)

The control device according to any one of (1) to (13) above, in which the image processing unit generates difference data by performing foreground/background difference processing between the second moving image and the third moving image captured by the imaging device, and further generates 3D model data on the basis of the difference data.

(15)

An Imaging System Including:

a plurality of imaging devices;

at least one display device;

a control unit that performs control to synchronize an imaging timing at which the plurality of imaging devices performs imaging with a display timing at which the display device located in an imaging range of at least one of the plurality of imaging devices displays a first moving image; and an image processing unit that performs foreground/background difference processing on the basis of a second moving image captured by the imaging device at a first timing and a third moving image captured by the imaging device at a second timing different from the first timing, in which the second moving image and the third moving image both include at least a part of the first moving image.

(16)

A 3D model data generation method including:

synchronizing an imaging timing at which the plurality of imaging devices performs imaging with a display timing at which a display device located in an imaging range of at least one of the plurality of imaging devices displays a first moving image, and imaging by a plurality of imaging devices;

generating difference data by performing foreground/background difference processing on the basis of a second moving image captured by the imaging device at a first timing and a third moving image captured by the imaging device at a second timing different from the first timing; and
generating 3D model data on the basis of the difference data.

REFERENCE SIGNS LIST

11 Control device
12-1 to 12-N Camera
13 Monitor
31 Operation unit
32 Control unit
33 Reproduction unit
34 Synchronization signal generation unit
35 Storage control unit
36 Storage unit
37 Image processing unit
41 Reproduction data storage unit
42 Imaging data storage unit
43 Foreground/background difference processing unit
44 3D model data generation unit
51 Imaging unit
52 Display unit
101 Synchronization signal generation device

The invention claimed is:

1. A control device comprising:
a control unit configured to perform control to synchronize an imaging timing at which an imaging device performs imaging with a display timing at which a display device imaged by the imaging device displays a first moving image, and
an image processing unit configured to perform foreground/background difference processing on a basis of a second moving image captured by the imaging device at a first timing and a third moving image captured by the imaging device at a second timing different from the first timing,
wherein the second moving image captured at the first timing and the third moving image captured at the second timing both include a same part of the first moving image to be synchronized between the second moving image and the third moving image, and
wherein the control unit and the image processing unit are each implemented via at least one processor.

2. The control device according to claim 1,
wherein the second moving image is a moving image including a subject and a background,
wherein the third moving image is a background moving image which is a moving image including the background, and
wherein the image processing unit performs the foreground/background difference processing using the moving image including the subject and the background of the second moving image and the background moving image of the third moving image.

3. The control device according to claim 2,
wherein the first moving image includes a reference moving image to be referred to when the second moving image is captured, and
wherein the control unit further performs control to cause the display device to display the reference moving image.

4. The control device according to claim 3,
wherein the reference moving image includes a moving image read from a predetermined storage unit in order to be reproduced.

5. The control device according to claim 4, further comprising:
a reproduction unit configured to decode the reference moving image prior to the display timing of the display device in order to reproduce the reference moving image stored in the predetermined storage unit,
wherein the reproduction unit is implemented via at least one processor.

6. The control device according to claim 3,
wherein the reference moving image is captured by the imaging device in capturing the second moving image.

7. The control device according to claim 3,
wherein the control unit is further configured to cause the display device to display the reference moving image at the first timing and the second timing.

8. The control device according to claim 7,
wherein the control unit causes the display device to display a frame image of the reference moving image for a same frame number of the second moving image and the third moving image when imaging the second moving image and the background third moving image.

9. The control device according to claim 1,
wherein the control unit generates is further configured to generate a synchronization signal,
cause the imaging device to perform imaging at a rising or falling timing of the synchronization signal, and
cause the display device to display the first moving image.

10. The control device according to claim 1,
wherein the control unit is further configured to perform control to synchronize an imaging timing at which a plurality of imaging devices performs imaging with a display timing at which a plurality of display devices displays the first moving image.

11. The control device according to claim 10,
wherein the control unit is further configured to cause the plurality of the display devices to display different first moving images respectively.

12. The control device according to claim 1,
wherein the control unit is further configured to perform control to cause the display device to display information indicating a time code together with the first moving image.

13. The control device according to claim 9, further comprising:
a synchronization signal generation unit configured to generate the synchronization signal on a basis of control of the control unit,
wherein the synchronization signal generation unit is implemented via at least one processor.

14. The control device according to claim 1,
wherein the image processing unit generates is further configured to
generate difference data by performing the foreground/background difference processing between the second moving image and the third moving image captured by the imaging device, and
generate 3D model data on a basis of the difference data.

15. An imaging system comprising:
a plurality of imaging devices;
at least one display device;
a control unit configured to perform control to synchronize an imaging timing at which the plurality of imaging devices performs imaging with a display timing at which the display device imaged by at least one of the plurality of imaging devices displays a first moving image; and an image processing unit configured to perform foreground/background difference processing on a basis of a second moving image captured by the imaging device at a first timing and a third moving image captured by the imaging device at a second timing different from the first timing, wherein the second moving image captured at the first timing and the third moving image captured at the second timing both include a same part of the first moving image to be synchronized between the second moving image and the third moving image, and wherein the control unit and the image processing unit are each implemented via at least one processor.

16. A 3D model data generation method comprising:

synchronizing an imaging timing at which a plurality of imaging devices performs imaging with a display timing at which a display device imaged by at least one of the plurality of imaging devices displays a first moving image;

generating difference data by performing foreground/background difference processing on a basis of a second moving image captured by the imaging device at a first timing and a third moving image captured by the imaging device at a second timing different from the first timing; and generating 3D model data on a basis of the difference data, wherein the second moving image captured at the first timing and the third moving image captured at the second timing both include a same part of the first moving image to be synchronized between the second moving image and the third moving image.

* * * * *